(12) United States Patent
Goodwin

(10) Patent No.: US 10,802,261 B2
(45) Date of Patent: Oct. 13, 2020

(54) CALIBRATION TARGETS FOR MICROSCOPE IMAGING

(71) Applicant: GLOBAL LIFE SCIENCES SOLUTIONS USA LLC, Marlborough, MA (US)

(72) Inventor: Paul Carlyle Goodwin, Issaquah, WA (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 32 days.

(21) Appl. No.: 15/665,413

(22) Filed: Jul. 31, 2017

(65) Prior Publication Data
US 2019/0033612 A1 Jan. 31, 2019
US 2019/0278100 A9 Sep. 12, 2019

Related U.S. Application Data

(63) Continuation of application No. 13/876,515, filed as application No. PCT/US2011/053818 on Sep. 29, 2011, now Pat. No. 9,720,222.
(Continued)

(51) Int. Cl.
G02B 21/36 (2006.01)
G02B 21/34 (2006.01)
(Continued)

(52) U.S. Cl.
CPC ....... *G02B 21/367* (2013.01); *G02B 21/0072* (2013.01); *G02B 21/16* (2013.01);
(Continued)

(58) Field of Classification Search
CPC ........ G02B 27/58; G02B 21/16; G02B 21/34; G02B 21/367; H04N 5/23232; H04N 9/646
(Continued)

(56) References Cited

U.S. PATENT DOCUMENTS 4,741,043 A    4/1988  James
6,184,535 B1 * 2/2001  Kashima ............ G01N 21/6428
                                                    250/458.1
(Continued)

FOREIGN PATENT DOCUMENTS

EP    1 592 233 A1   11/2005
EP    2 077 462 A1    7/2009
(Continued)

OTHER PUBLICATIONS

Extended European Search Report and Opinion issued in connection with corresponding EP Application No. 11833090.1 dated Mar. 5, 2018.
(Continued)

*Primary Examiner* — Joseph G Ustaris
*Assistant Examiner* — Matthew David Kim
(74) *Attorney, Agent, or Firm* — Eversheds Sutherland (US) LLP

(57) ABSTRACT

This disclosure is directed to optical microscope calibration devices that can be used with optical microscopes to adjust the microscope imaging parameters so that images of samples can be obtained below the diffraction limit. The microscope calibration devices include at least one calibration target. Each calibration target includes a number of features with dimensions below the diffraction limit of a microscope objective. Separate color component diffraction limited images of one of the calibration targets are obtained for a particular magnification. The color component images can be combined and image processed to obtain a focused and non-distorted image of the calibration target. The parameters used to obtain the focused and non-distorted image of the calibration target can be used to obtain focused and non-distorted images of a sample for the same magnification by using the same parameters.

19 Claims, 19 Drawing Sheets

Related U.S. Application Data

(60) Provisional application No. 61/387,737, filed on Sep. 29, 2010.

(51) Int. Cl.
*G02B 21/00* (2006.01)
*G02B 21/16* (2006.01)
*G02B 27/32* (2006.01)
*G02B 27/58* (2006.01)
*H04N 5/232* (2006.01)
*H04N 17/00* (2006.01)
*H04N 9/64* (2006.01)

(52) U.S. Cl.
CPC ........... *G02B 21/34* (2013.01); *G02B 21/365* (2013.01); *G02B 27/32* (2013.01); *G02B 27/58* (2013.01); *H04N 5/23232* (2013.01); *H04N 5/23296* (2013.01); *H04N 17/002* (2013.01); *H04N 9/646* (2013.01)

(58) Field of Classification Search
USPC .......................................................... 348/79
See application file for complete search history.

(56) References Cited

U.S. PATENT DOCUMENTS

| | | | |
|---|---|---|---|
| 8,237,786 B2 | 8/2012 | Danuser et al. | |
| 2002/0098588 A1* | 7/2002 | Sammak | G01N 21/278 436/172 |
| 2002/0179829 A1 | 12/2002 | Nikitin et al. | |
| 2003/0015668 A1* | 1/2003 | Montagu | B01L 3/0244 250/458.1 |
| 2003/0211336 A1* | 11/2003 | Tsai | B82Y 20/00 428/432 |
| 2004/0150217 A1 | 8/2004 | Heffelfinger et al. | |
| 2004/0223214 A1* | 11/2004 | Atkinson | G02B 21/002 359/385 |
| 2004/0227937 A1 | 11/2004 | Richardson | |
| 2005/0048599 A1* | 3/2005 | Goldberg | B82Y 5/00 435/34 |
| 2005/0168614 A1 | 8/2005 | Okada et al. | |
| 2006/0033920 A1* | 2/2006 | Luther | G01N 15/1468 356/432 |
| 2006/0038891 A1* | 2/2006 | Okutomi | H04N 9/045 348/222.1 |
| 2006/0071075 A1* | 4/2006 | Moon | G06K 7/1094 235/454 |
| 2007/0062918 A1* | 3/2007 | Li | B23K 26/0613 219/121.69 |
| 2007/0115457 A1* | 5/2007 | Matsuzawa | G01M 11/0264 356/124 |
| 2007/0211243 A1 | 9/2007 | Laroche et al. | |
| 2007/0211460 A1* | 9/2007 | Ravkin | G02B 6/0068 362/231 |
| 2009/0098081 A1* | 4/2009 | MacDonald | A61M 35/003 424/78.07 |
| 2009/0147355 A1* | 6/2009 | Jennings | G02B 21/26 359/391 |
| 2009/0190855 A1 | 7/2009 | Kasahara | |
| 2009/0276188 A1* | 11/2009 | Cui | G01J 9/02 702/189 |

FOREIGN PATENT DOCUMENTS

| | | |
|---|---|---|
| JP | S53-111748 A | 9/1978 |
| JP | S62-145991 A | 6/1987 |
| JP | H07-168102 A | 7/1995 |
| JP | H08-285502 A | 11/1996 |
| JP | H09-203865 A | 8/1997 |
| JP | 2001-103358 A | 4/2001 |
| JP | 2003-255424 A | 9/2003 |
| JP | 2004-117267 A | 4/2004 |
| JP | 2005-258153 A | 9/2005 |
| JP | 2006-275964 A | 10/2006 |
| JP | 2008-009184 A | 1/2008 |
| JP | 2008-083069 A | 4/2008 |

OTHER PUBLICATIONS

Edwards, P.R., et al., "Quantum dot emission from site-controlled InGaN/GaN micropyramid arrays," Applied Physics Letters, AIP Publishing, vol. 85, No. 19, pp. 4281-4283 (Nov. 8, 2004).
Simeonov, D., "Synthesis and Optical Investigation of SinglePolar GaN/AlN Quantum Dots," Federal Institute of Technology, pp. 1-190 (Dec. 18, 2008).
Notification of Reasons for Refusal issued in connection with corresponding JP Application No. 2013-531823 dated Jun. 25, 2015.
Notification of Reasons for Refusal issued in connection with corresponding JP Application No. 2013-531823 dated Feb. 22, 2016.
Decision to Grant issued in connection with corresponding JP Application No. 2013-531823 dated Jun. 21, 2016.
Partial Supplementary European Search Report and Opinion issued in connection with corresponding EP Application No. 11833090.1 dated Oct. 26, 2017.

* cited by examiner

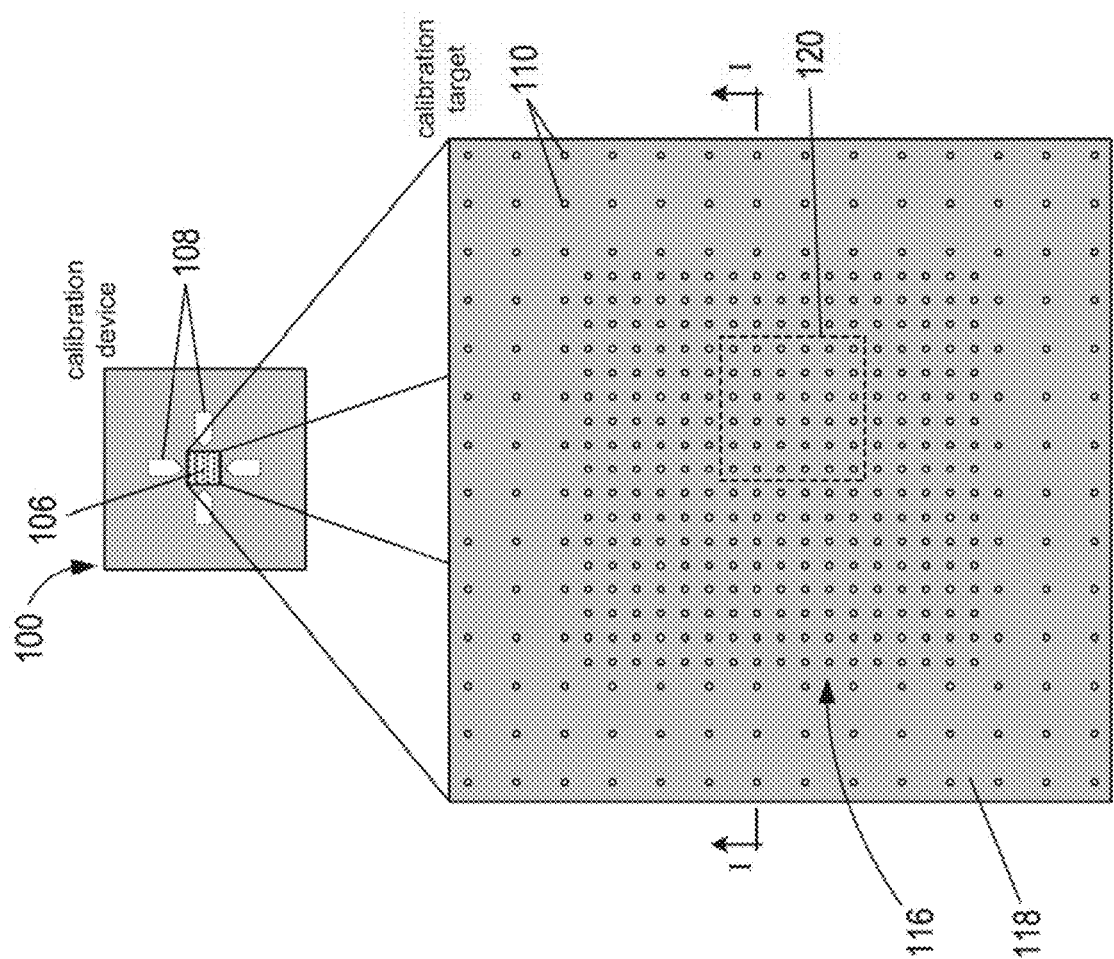
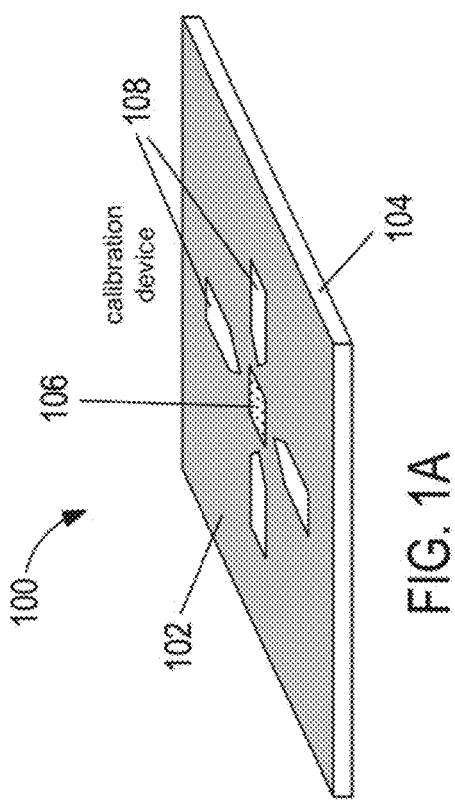
FIG. 1B
FIG. 1A

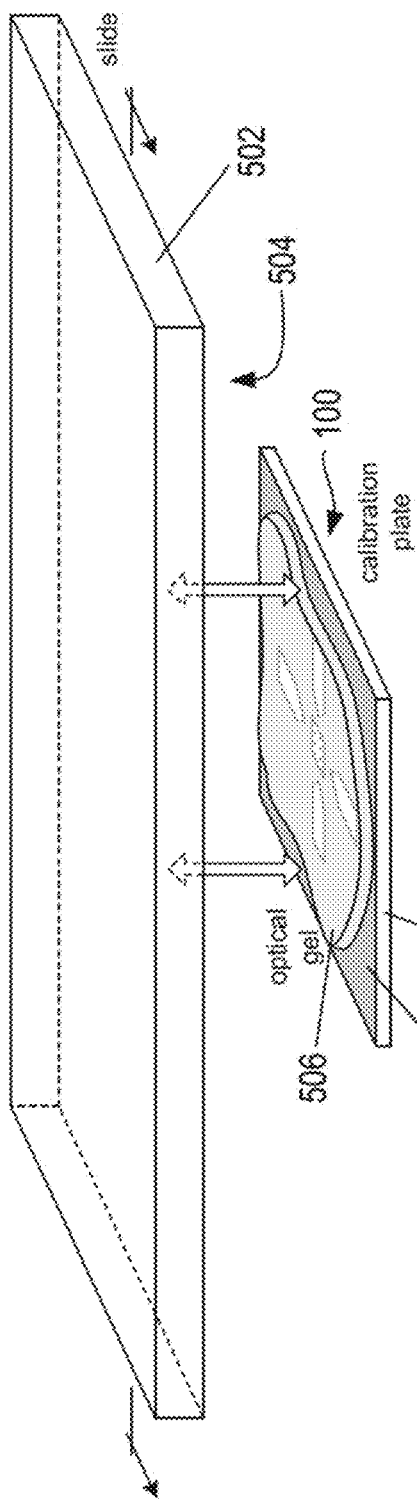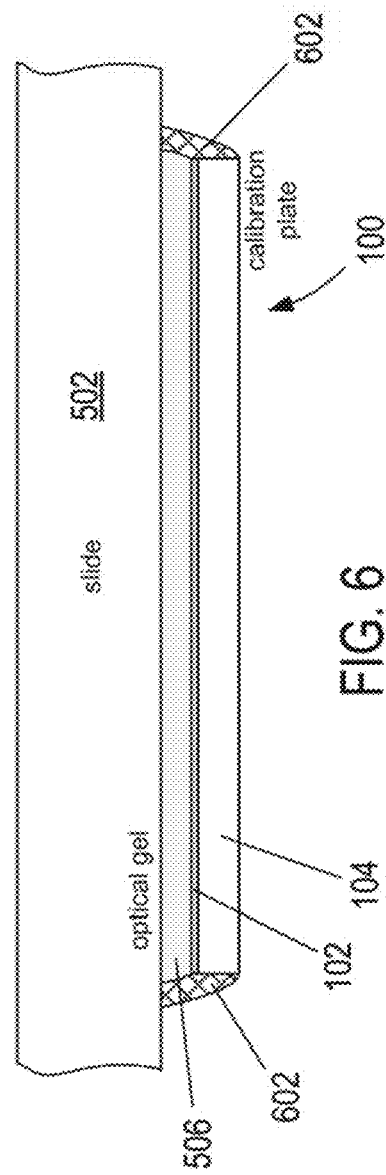
FIG. 5
FIG. 6

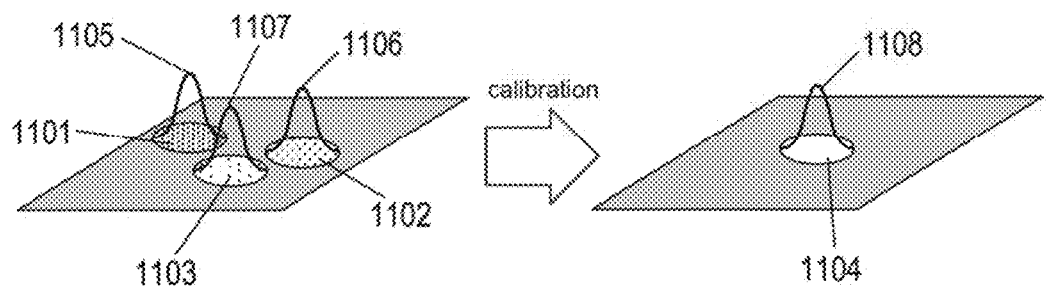
FIG. 11A
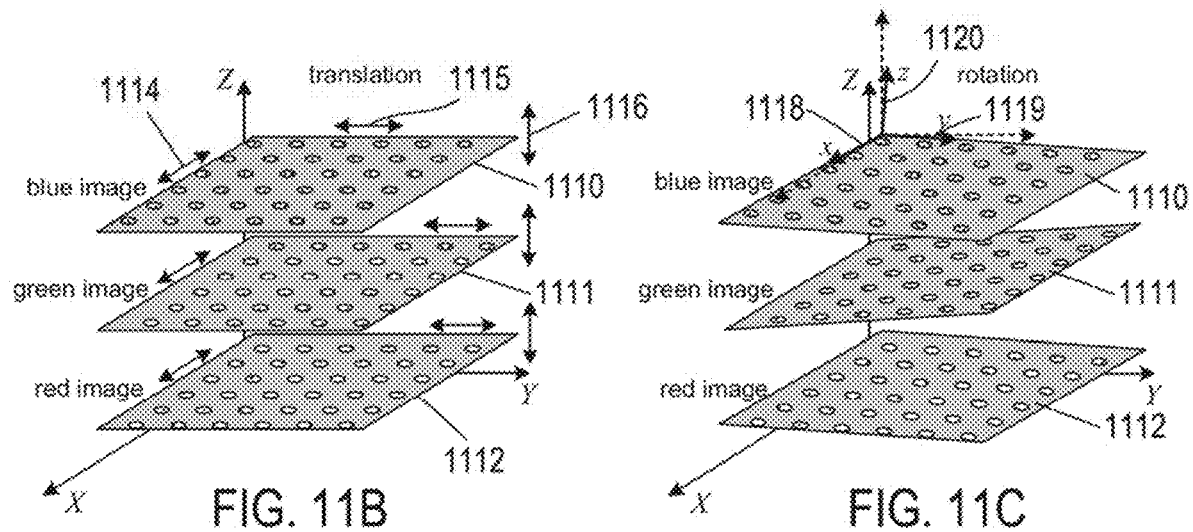
FIG. 11B
FIG. 11C
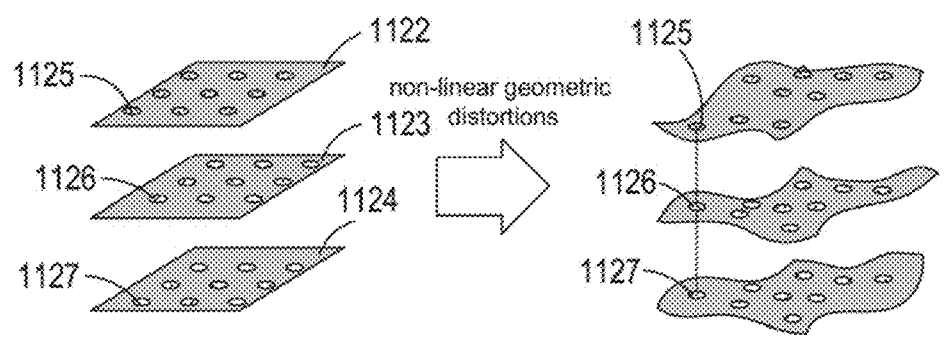
FIG. 11D

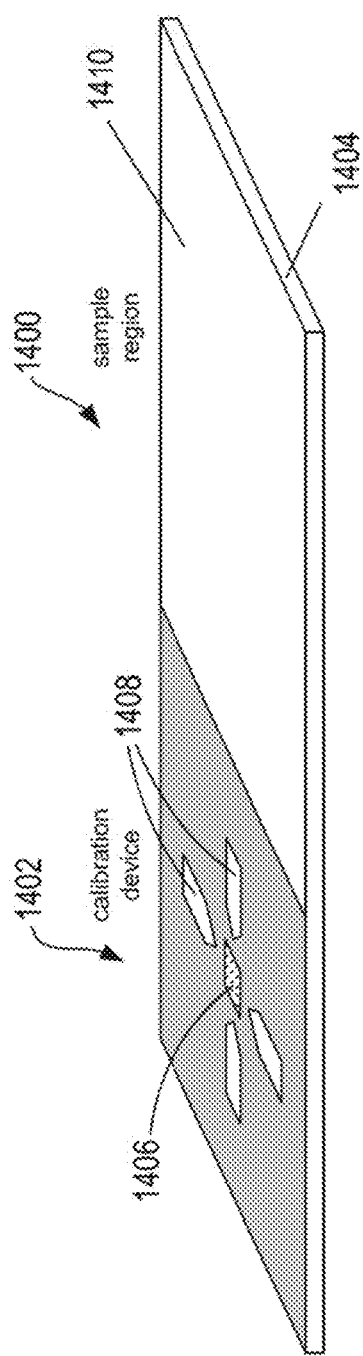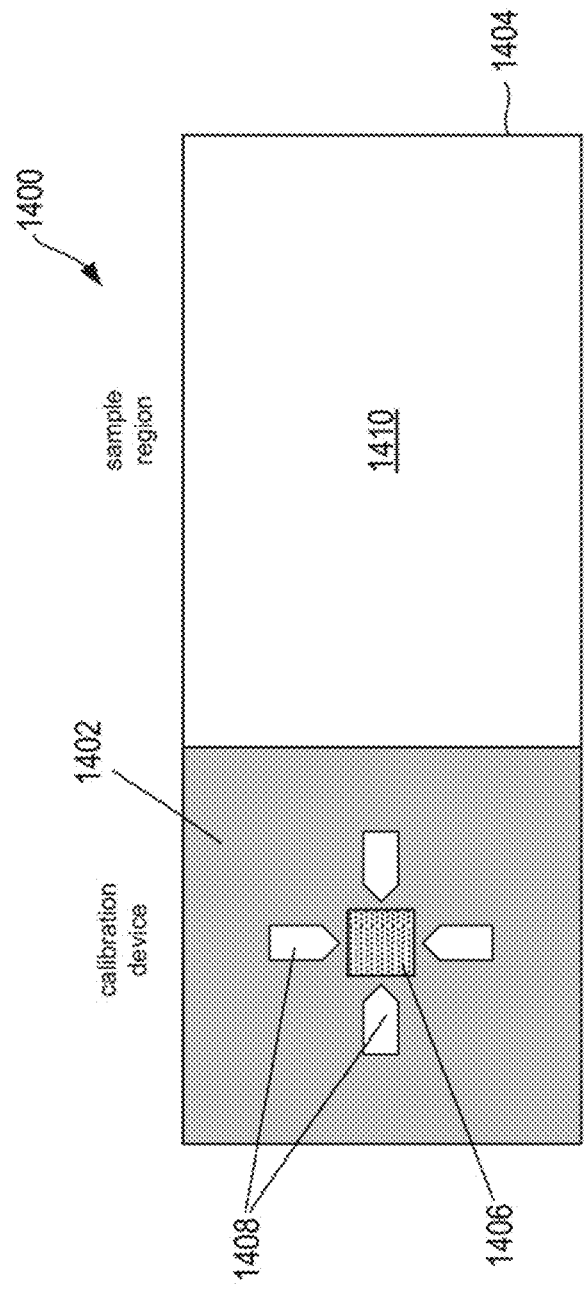
FIG. 14A
FIG. 14B

CALIBRATION TARGETS FOR MICROSCOPE IMAGING

CROSS-REFERENCE TO RELATED APPLICATION

This application is a continuation of U.S. patent application Ser. No. 13/876,515, filed Mar. 28, 2013, which is a filing under 35 U.S.C. 371 of international application number PCT/US2011/053818, filed Sep. 29, 2011, which claims the priority and benefit of U.S. Provisional Application No. 61/387,737 filed Sep. 29, 2010, the entire disclosures of each of which are hereby incorporated by reference.

TECHNICAL FIELD

The disclosure relates to microscopy imaging technologies, and, in particular, to systems and methods for enhancing microscope magnification.

BACKGROUND OF THE INVENTION

Many different types of imaging systems are employed in modern scientific research to acquire images of small or distant objects, including extremely high-resolution electron microscopes, extremely high-resolution scanning tunneling ("STM") and atomic-force ("AFM") imaging instruments, and many different types of optical microscopes, telescopes, and image-generating sensors. As with most types of imaging devices, instruments, and techniques, there are many different trade-offs and balances associated with different types of microscopy. For example, transmission electron microscopy is carried out on fixed and thinly-sectioned samples, and is therefore constrained for use on essentially two-dimensional, non-living samples. Scanning-tunneling and atomic-force microscopy are non-optical techniques for obtaining high-resolution images of the surfaces of materials, but cannot be used to obtain information about the nanoscale or microscale contents of volumes of samples below surfaces. All types of microscopy are constrained, in one way or another, by resolution limitations, but optical microscopy is associated with the perhaps best-known resolution limitation referred to as the "diffraction limit," which limits traditional visible-light optical microscopy to a resolution limit of about 200 nm.

During the past 20 years, various super-resolution techniques have been developed to allow imaging of fluorophore-labeled samples, most often biological samples, by optical fluorescence-microscopy instruments at resolutions significantly below the diffraction-limited resolution for traditional optical microscopy. These techniques are based on collecting fluorescent light emitted from fluorophore-labeled samples over time. Providing that the emitting fluorophores are separated from one another by distances greater than about 200 nm, or, in other words, provided that the positions of the fluorophores in the sample would be resolvable by traditional optical microscopy, the positions of the fluorophores in a sample can be determined, in certain cases, to a resolution of below 10 nm. However, because the fluorescent-emission signal can be interpreted only when the emitting fluorophores are sparsely arranged within the sample, a generally large number of intermediate images need to be produced from different sets of sparsely arranged fluorophores in order to construct a super-resolution, final image of a fluorophore-labeled object. Thus, super-resolution images are obtained at the expense of the time needed to accumulate a relatively weak signal to produce a larger number of intermediate images. The time needed for super-resolution imaging does not favor imaging of live cells, which tend to move and change shape over the periods of time needed to collect the relatively weak signal from which super-resolution images are constructed. The long time periods needed to collect the relatively weak signal may also result in exposure of living cells to deleterious or fatal levels of electromagnetic radiation, including ultraviolet light. The time needed to acquire sufficient data for super-resolution imaging may also represent a significant experimental constraint, regardless of the type of sample that is imaged. For all these reasons, those who design and develop, manufacture, and optical microscopes continue to seek systems and methods to capture images below the diffraction limit.

SUMMARY OF THE INVENTION

This disclosure is directed to optical microscope calibration devices that can be used with optical microscopes to adjust the microscope imaging parameters so that images of samples can be obtained below the diffraction limit. The microscope calibration devices include at least one calibration target. Each calibration target includes a number of features with dimensions below the diffraction limit of a microscope objective. Separate color component diffraction limited images of one of the calibration targets are obtained for a particular magnification. Image processing can be used to combine the color component images and obtain a focused and non-distorted image of the calibration target. The parameters used to obtain the focused and non-distorted image of the calibration target can be used to obtain focused and non-distorted images of a sample for the same magnification with the same parameters.

BRIEF DESCRIPTION OF THE DRAWINGS

FIGS. 1A-1C show different views of an optical microscope calibration device.

FIG. 5 shows a calibration device to be secured to a surface of a microscope slide.

FIG. 6 shows a cross-sectional view of a calibration device attached to a surface of a slide.

FIGS. 11A-11D show a graphical representation of calibration parameters to be determined when calibrating a pre-image to produce a calibrated image.

FIGS. 14A-14B show an isometric and top-plan view of a cover slip with a calibration device.

DETAILED DESCRIPTION OF THE INVENTION

Figure 1C:
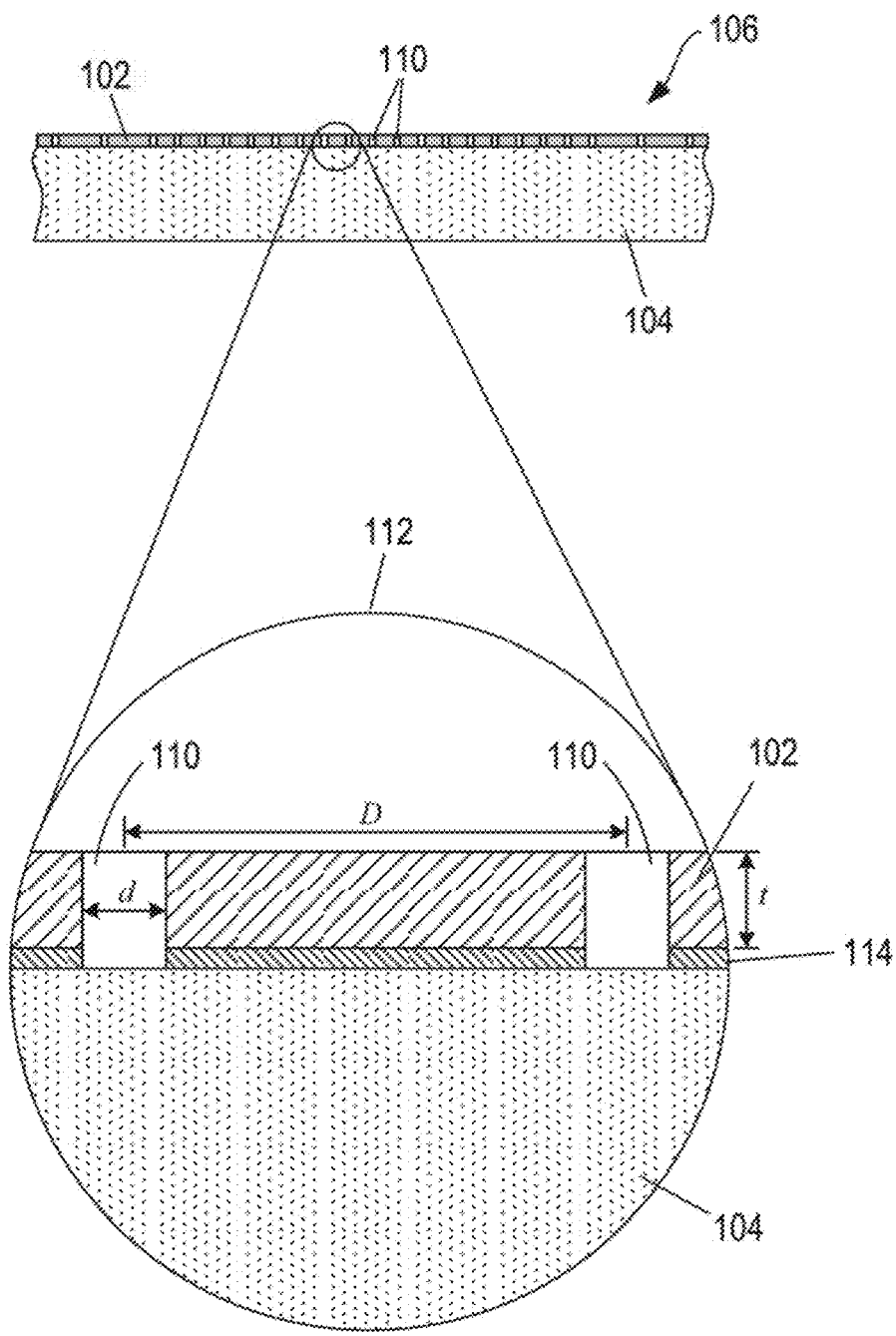

FIGS. 1A-1C show different views of an optical microscope calibration device 100. In FIG. 1A, the calibration device 100 includes an opaque layer 102 disposed on a transparent plate 104. The opaque layer 102 includes a calibration target 106 located in the approximate center of the device 100. The device 100 may also include a number of directional arrows 108 disposed on the opaque layer 102 outer surface to aid in positioning the device 100 so that the target 106 is located within the field of view of a microscope objective. FIG. 1B shows a magnified view of the calibration target 106 composed of a two-dimensional square-lattice of features 110. In other embodiments, the features 108 can have other two-dimensional lattice arrangements, such as rhombic, a hexagonal, a rectangular, parallelogrammic, or even a random distribution of features. The features 110 can be holes formed in the opaque layer 102. FIG. 1C shows a cross-sectional view of the calibration target 106 portion of the calibration device 100 along a line I-I shown in FIG. 1B. The cross-sectional view reveals the opaque layer 102 disposed on a surface of the transparent plate 104 and the features 110 are holes located within the layer 102. FIG. 1C includes a magnified view 112 of the layer 102 and a portion of the transparent plate 104. The magnified view 112 reveals a thin adhesive layer 114 to adhere the layer 102 to the surface of the transparent plate 104 and shows the holes 110 spanning the height of the opaque layer 102 and the adhesive layer 114 and having substantially perpendicular sidewalls to the surface. In other words, each hole 110 exposes a portion of the transparent layer 104 surface upon which the adhesive layer 114 is disposed.

As shown in FIG. 1C, the thickness, T, of the transparent plate 102 can range from about 0.1 mm to about 1.0 mm and can be composed of any suitable transparent material, such as glass or a transparent polymer. The thickness, t, of the opaque layer 102 can range from about 20 nm to about 100 nm or more and can be composed of any suitable opaque material, such as gold ("Au") and silver ("Ag"). The adhesive layer 114 can be composed of any suitable material that attaches the opaque layer 102 to a surface of the transparent layer 104. For example, if the opaque layer 102 is composed of Au and the transparent plate 104 is composed of glass, then chromium ("Cr") can be used to attach the opaque layer 102 to the glass surface.

As shown the example of FIG. 1B, the lattice of holes 110 includes an inner densely-packed square lattice of holes 116 surrounded by a less densely-packed square lattice of holes 118. Returning to FIG. 1C, the distance, D, between adjacent inner lattice holes 110 can range from about 2 μm to about 8 μm and the distance between adjacent outer lattice holes can range from about 5 μm to about 15 μm. The diameter, d, of the holes 110 can range from about 50 nm to about 190 nm. Note that the diameters of the holes can be selected to be less than the diffraction limit of the microscope, which is about ~λ/2 where Δ is the wavelength of the light. For example, in one embodiment of the calibration device 100, the holes 110 may have a diameter of about 100 nm with an inner lattice distance of 5 μm and an outer lattice distance of about 10 μm. The diameter of about 100 nm is well below the diffraction limit of visible-light optical microscopy which has a resolution limit of about 200 nm.

The calibration device 100 can be fabricated by first depositing a layer of adhesive on a surface of a transparent plate. The adhesive can be deposited by spraying or brushing the adhesive onto the surface. After the adhesive layer is deposited, the opaque layer is deposited. If the opaque layer is metal or semiconductor, the opaque layer can be deposited using plasma or chemical vapor deposition or wafer bonding. Holes can be formed in the opaque and adhesive layers using focused ion beam milling to produce holes with substantially straight cylindrical walls.

In alternative embodiments, the features 108 can be beads disposed on the opaque layer 102. The beads have a diameter d and can be reflective beads or fluorescent beads that fluoresce when exposed to light of a particular wavelength.

Figure 2:
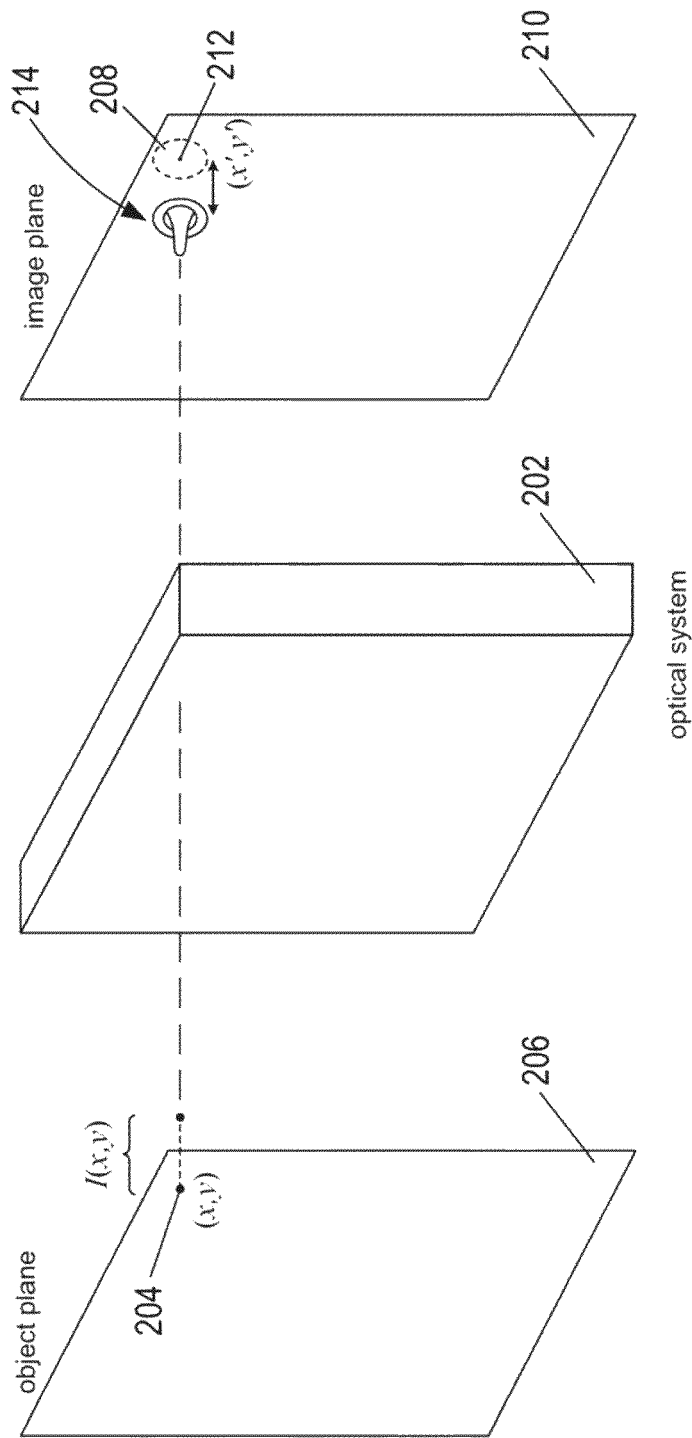
FIG. 2 shows an optical system that receives light output from a point source in an object plane and spreads out to produce a spot in a corresponding image plane.

The calibration device 100 in combination with image processing described below can produce images of microscopic elements of a sample that lie below the diffraction limit. Consider, for example, a typical diffraction-limited optical system, such as a microscope, which can only collect a portion of the incident wavefront to be reformed into an image in an image plane. The light passing through the optical system deviates from straight-line propagation and spreads out somewhat in the image plane. When an optical system with a circular aperture receives plane waves output from a point source in an object plane, rather than there being a corresponding image point in the image plane, the light actually spreads out into a tiny circular spot called an Airy disk surrounded by faint rings. The radius of the Airy disk determines the overlapping of neighboring images and therefore the resolution. FIG. 2 an optical system 202 that receives light output from a point source (x, y) 204 in an object plane 206 and spreads the light out to produce a spot 208 in a corresponding image plane 210. The light output from the point source 204 has an irradiance I(x, y) and is transformed by the optical system 202 into the spot 208 centered about a point (x', y') 212 with a corresponding irradiance represented by a symmetrical point-spread function 214 over the spot 208. For example, a suitable point spread function used to represent the irradiance distribution over a spot such as the spot 208 can be an Airy function.

Figure 3A:
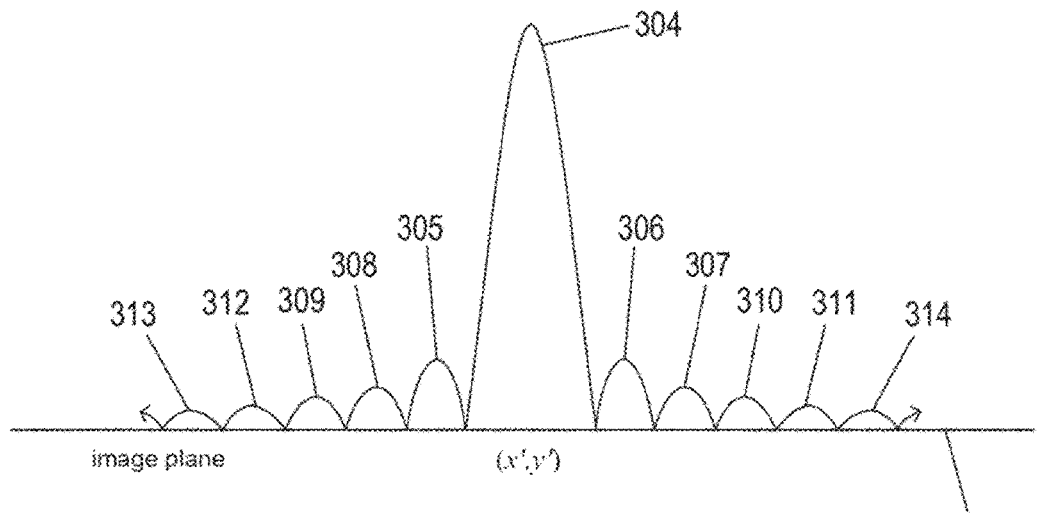
FIGS. 3A-3B show an example representation of a theoretical point-spread function.
Figure 3B:
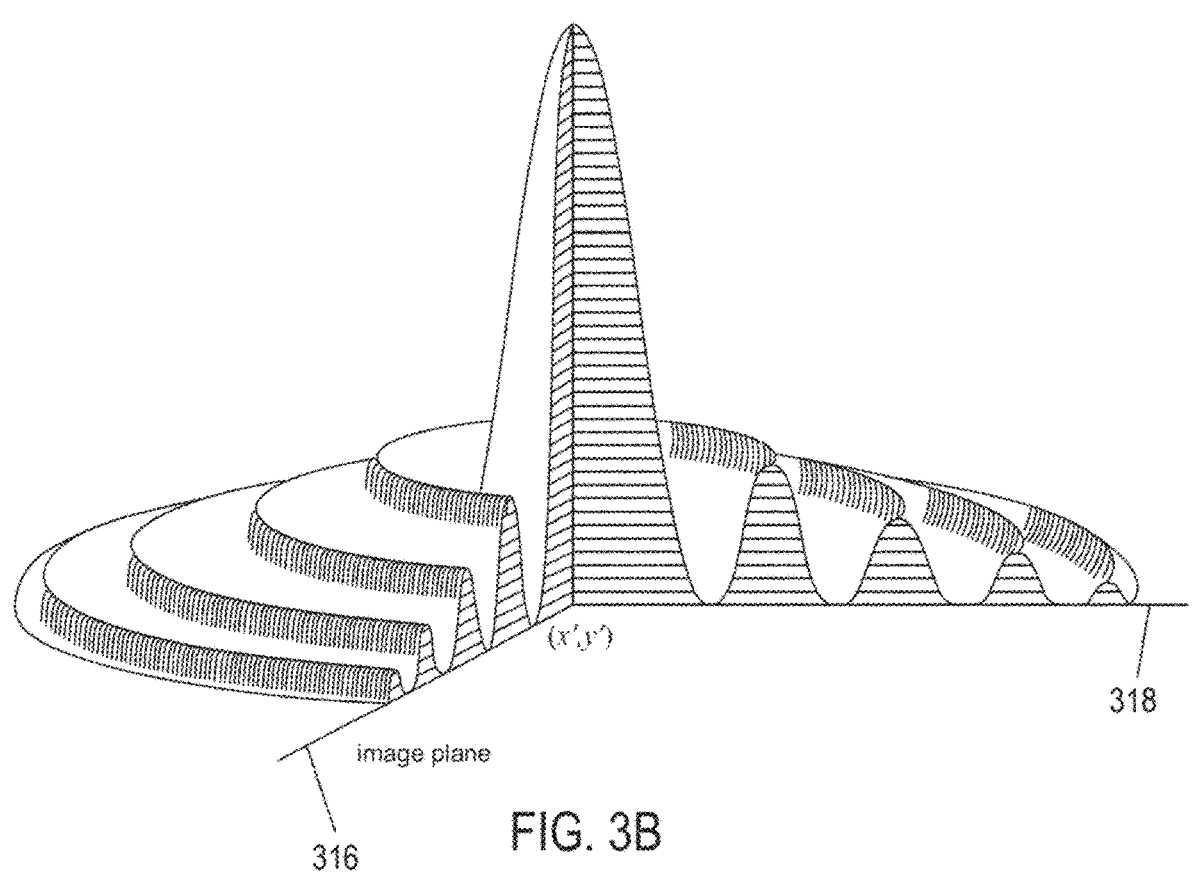

FIG. 3A shows an example representation of a theoretical point-spread function in one dimension within an image plane. Horizontal axis 302 is a line in the image plane passing through a point (x', y') in the image plane, such as the point 212 shown in FIG. 2. The theoretical Point-spread function has a tall, relatively narrow central peak 304 with secondary peaks of decreasing height 305-314 extending in both directions away from the central peak. The height of the curve corresponds to intensity and the horizontal axis 302 corresponds to linear distance from the origin in the output-image plane. FIG. 3B provides a representation of the point-spread function in three-dimensional space, where the two horizontal axes 316 and 318 lie in the plane of the image plane and cross at the point (x', y') and the height, at any point on the surface of the point-spread function corresponds to the intensity observed at a corresponding position on the image plane. An image of the impulse-response function produced by an optical system appears to be a central bright disk, corresponding to the central peak of the point-spread function, with concentric rings of increasing radius corresponding to the rings or ridges surrounding the central peak.

Figure 4:
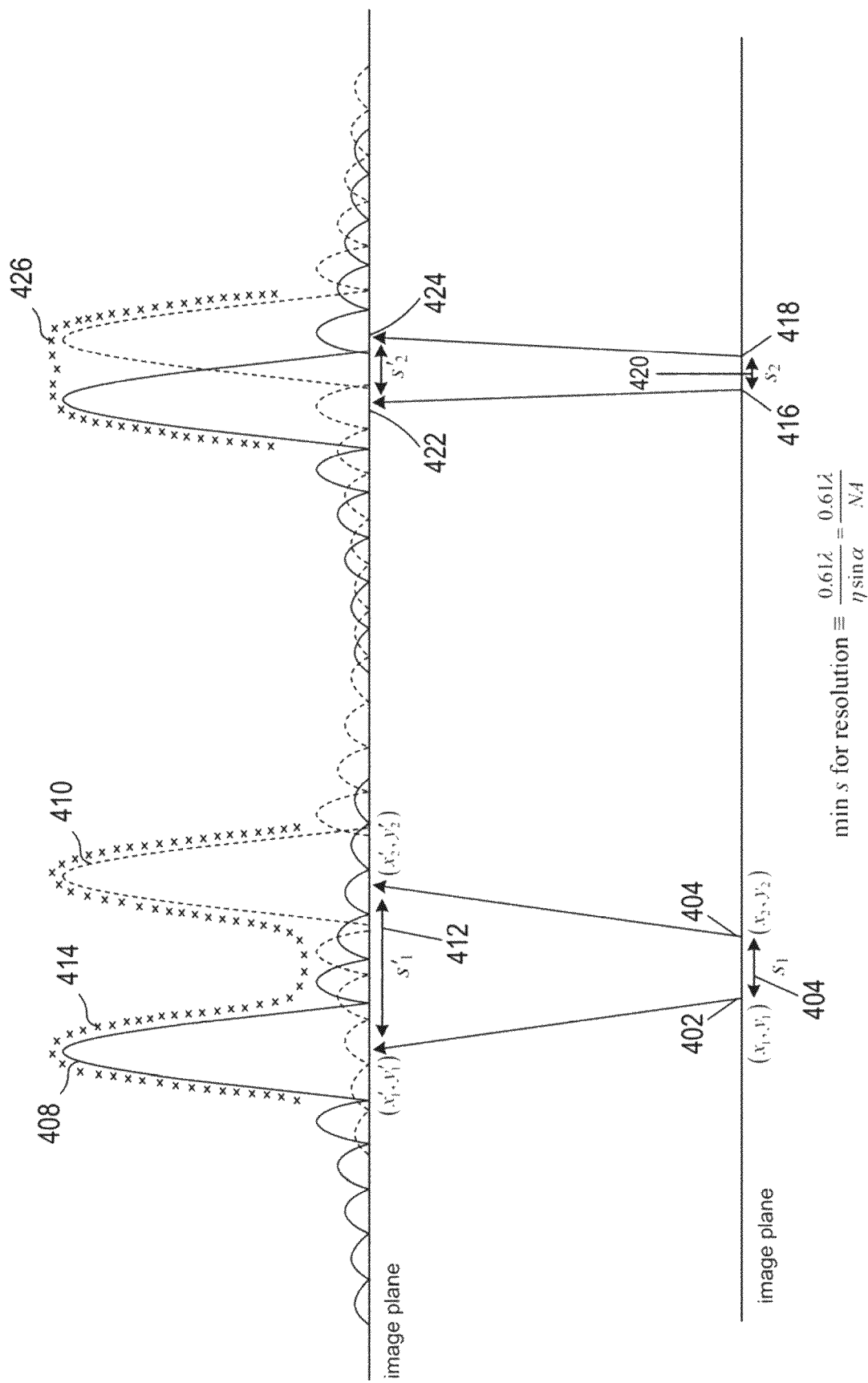
FIG. 4 shows a diffraction limit associated with an optical system.

FIG. 4 shows the diffraction limit associated with an optical system. Consider two points $(x_1, y_1)$ 402 and $(x_2, y_2)$ 404 in an object plane separated by distance $s_1$ 406. The images of these two points output from an optical system are two point-spread functions 408 and 410 centered at image points $(x'_1, y'_1)$ and $(x'_2, y'_2)$. The spreading of light from point sources 402 and 404 into spots with irradiance distributions represented by point-spread functions 408 and 410 in the image plane is a diffraction-related phenomenon. When $s_1$ is sufficiently large that the corresponding distance $s'_1$ 412 between the centers of the point-spread functions 408 and 410 in the image plane separates the Point-spread functions so that the sum of the two point-spread function, represented in FIG. 4 by curve 414, remains clearly bimodal, the images of the points 402 and 404 in the image plane can be distinguished from one another. However, when two points 416 and 418 in the object plane are separated by a sufficiently small distance $s_2$ 420 that the corresponding images of the two points 422 and 424 in the image plane overlap, with the sum of the two point-spread functions, represented by curve 426, merging into a single peak, the two points 416 and 418 cannot be distinguished from one another in the image plane. The minimum spacing, or maximum resolution, for traditional optical microscopy is generally regarded as:

$$\frac{0.61\lambda}{\eta\sin\theta} = \frac{0.61\lambda}{NA}$$

where $\theta$ is the half-angle of the maximum cone of light that can enter or exit the optical system;

$\lambda$ is the wavelength of light;

$\eta$ is the index of refraction of the medium in which the optical system is operating; and NA is the numerical aperture of the microscope objective.

The minimum spacing, or maximum resolution, in the input image corresponds to spacing between Point-spread functions at which the first left-hand zero point of the right-hand point-spread function coincides with the first right-hand zero point of the left-hand point-spread function. The minimum separation, or maximum resolution, of features that can be imaged corresponds to about 200 nm for optical microscopy systems. The minimum spacing, or maximum resolution, is referred to as "the diffraction limit," since the Point-spread function images of point sources in the image plane arise as a result of diffraction.

The diffraction limit discussed with reference to FIG. 4 is not an absolute resolution limit for images of samples obtain using optical microscopy. Magnified images of the calibration target 100 obtained below the diffraction limit can be processed using various imaging techniques to obtain image processing calibration parameters that can in turn be used to adjust images of samples with a magnification resolution also below the diffraction limit. A description with reference to FIGS. 5-11 of how the calibration target 100 can be used to determine a set of the calibration parameters that can be used adjust images of samples with a magnification resolution below the diffraction limit is now provided.

FIG. 5 shows the calibration device 100 to be secured to a surface of a microscope slide 502. In FIG. 5, the calibration device 100 is positioned so that the opaque surface 102 faces a surface 504 of the slide 502. An optical gel 506 having an index of refraction that substantially matches the refractive indices of the slide 502 and the transparent plate 104 is disposed between the opaque surface 102 and the surface 504 of the slide 502. For example, the transparent plate 104 and slide 502 can be composed of glass with a refractive index of 1.52 and the optical gel 506 can be composed of material also with a refractive index of 1.52. FIG. 6 shows a cross-sectional view of the calibration device 100 attached to the surface of the slide 502 using an adhesive 602 located along the edges of the calibration device 100. The adhesive 602 can be a polymer adhesive, such as tosylamide-formaldehyde resin, which can adhere to a polished surface, such as the polished surface of the slide 502.

Figure 7:
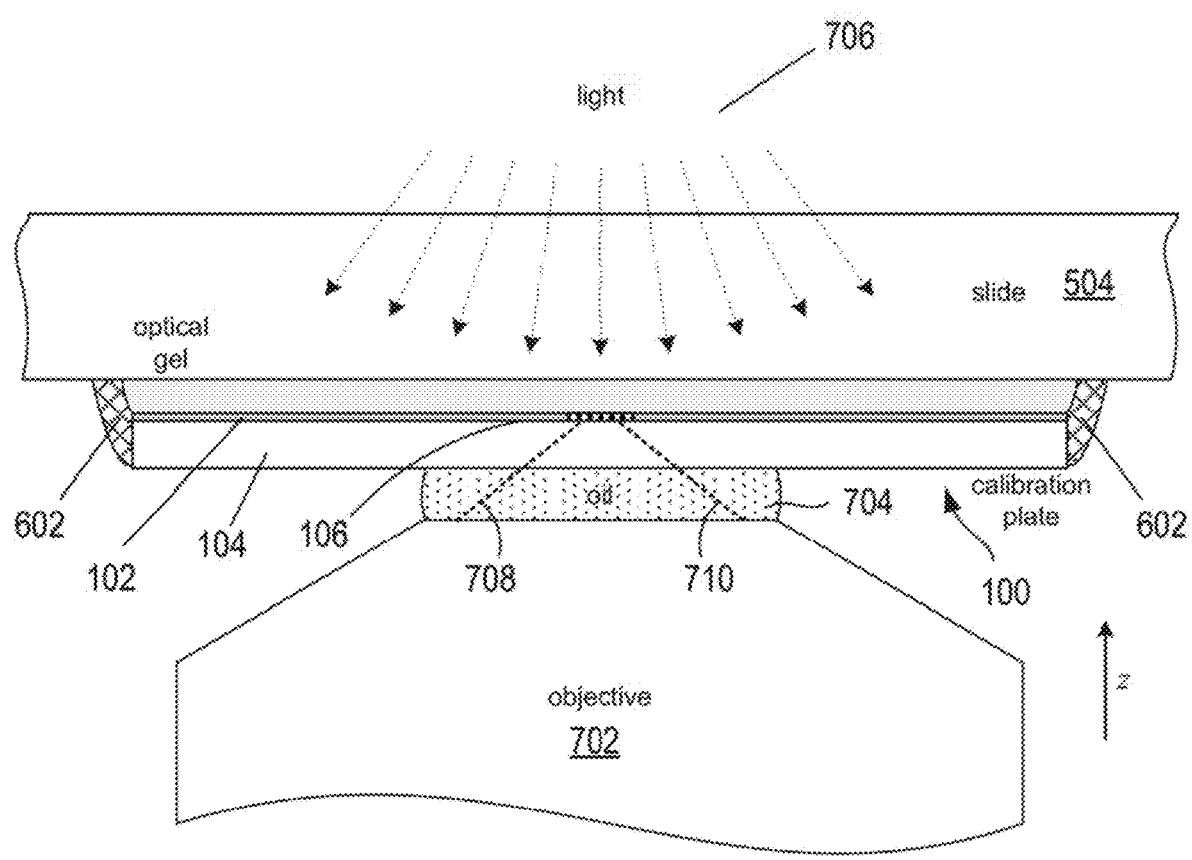
FIG. 7 shows a cross-sectional view of a slide with an attached calibration device.

The slide 502 and calibration device 100 are then placed on a microscope stage with the calibration device 100 facing the microscope objective and the slide 502 facing the microscope light source. FIG. 7 shows a cross-sectional view of the slide 502 with attached calibration device 100 positioned for viewing with a microscope objective 702 of an optical microscope. In FIG. 7, an immersion oil 704 is disposed between the transparent plate 104 and the objective 702. The immersion oil 704 has an index of refraction that substantially matches the refractive index of the transparent plate 104 and the slide 502. Light 706 is output from an illumination source located opposite the objective 702. The light 706 passes through the slide 502 and the calibration target 106. As shown in FIG. 7, the objective 702 is positioned so that light passing through at least a portion of the calibration target 106 falls within the field of view of the objective defined by dashed lines 708 and 710. FIG. 7 is not intended to limit the use of the calibration device 100 with oil immersion objectives. The calibration device 100 can be used with other types of microscope objectives, such as objectives that work in an air medium and objectives that work in a water medium.

The calibration device 100 can be used with many different kinds of light sources. For example, suitable light sources include an incandescent light, a halogen lamp, or any source that emits light over a broad range of wavelengths in the visible spectrum. Other suitable light sources include light-emitting diodes ("LEDs") and lasers that emit light over narrow wavelength bands in the visible spectrum, such as the blue, green or red bands of the visible spectrum.

Figure 8A:
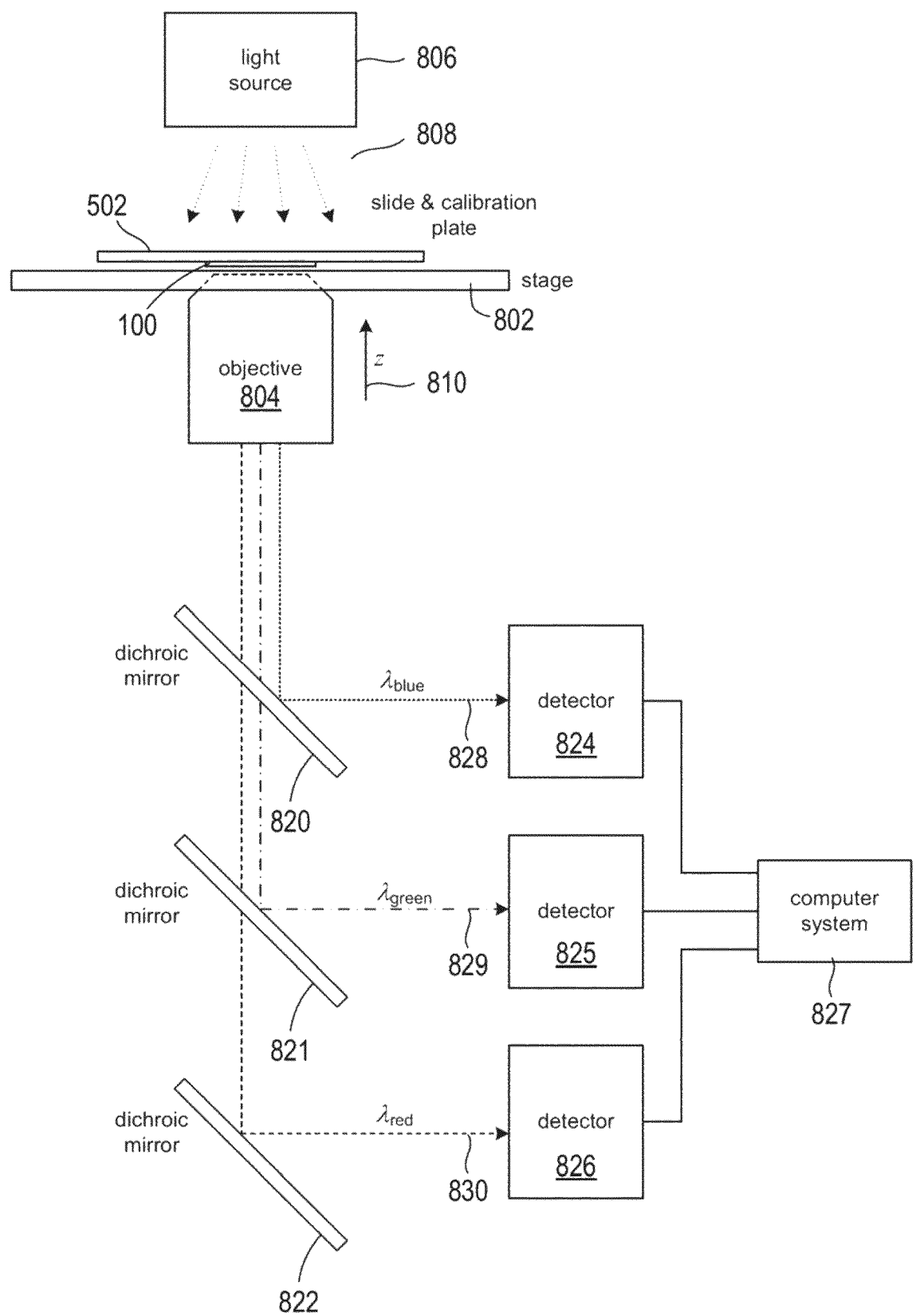
FIG. 8A shows optical paths within a microscope with a light source that emits light over a broad range of wavelengths in the visible spectrum.

FIG. 8A shows the optical path within a microscope with a light source that emits light over a broad range of wavelengths in the visible spectrum, such as a halogen lamp. There are many different types of microscopes and corresponding optical paths. FIG. 8A is not intended to represent the optical paths within all the different, well-known variations of microscopes nor does FIG. 8A represent all the various components of a microscope. FIG. 8A is intended to show the general principals of microscopy as applied to microscope imaging using the calibration device 100 to obtain image processing parameters that can be used to process images of samples taken below the diffraction limit. In FIG. 8A, the slide 502 and calibration device 100 are disposed on a stage 802 with the transparent plate 104 facing a microscope objective 804 and a light source 806 positioned opposite the slide 502. Dotted-line directional arrows 808 represent light emitted from the light source 806. The light source 806 can be an incandescent light, a halogen lamp, or any light source that emits light over a broad range of wavelengths in the visible spectrum. Light emitted from the light source 802 passes through the slide 502 and calibration device 100. Lower magnification objectives can be used to locate the directional arrows 108 of the plate 100 (shown in FIG. 1) in order to place at least a portion of the calibration target 106 along the optical axis of the microscope objectives. A higher magnification objective 804 is selected and the objective 804 and/or stage 802 are positioned in the z-direction 810 to obtain a magnified image of a sub-region of the calibration target 106.

Figure 8B:
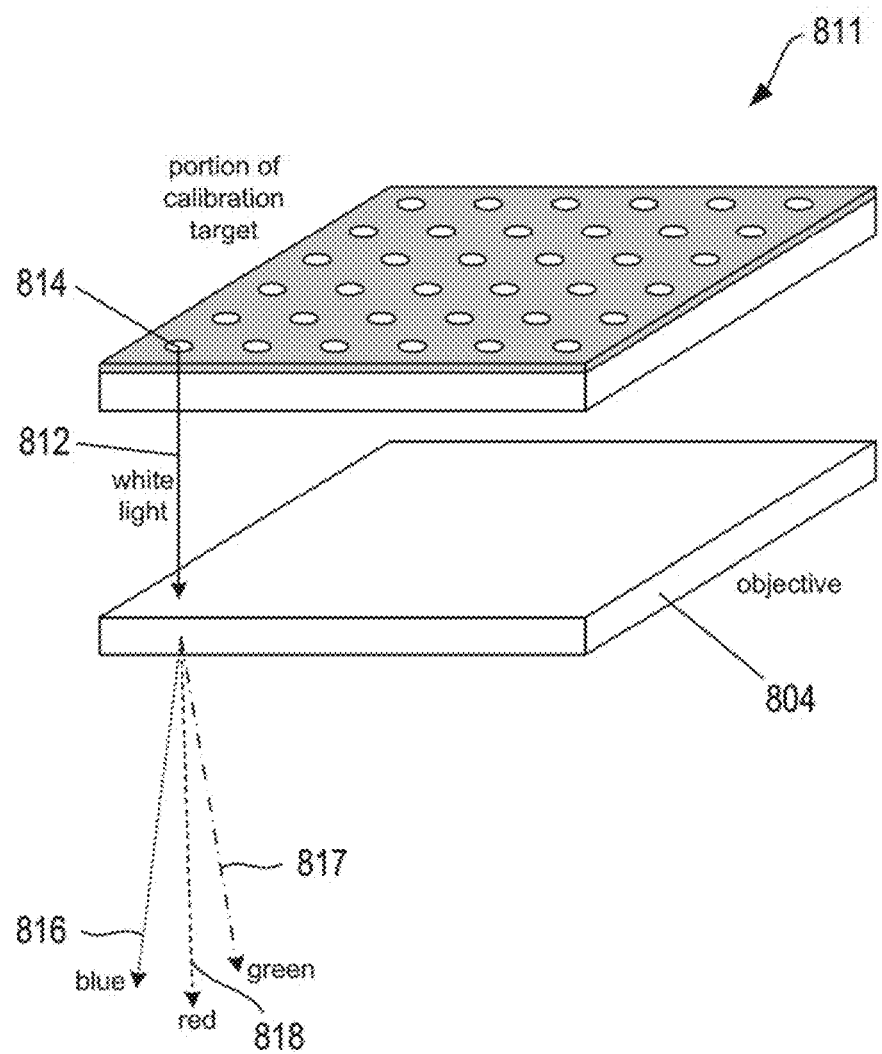
FIG. 8B shows an example of a beam of light output from a hole in a sub-region of a calibration target.

As described above with reference to FIG. 1, the diameter of the holes (e.g., ~100 nm) comprising the calibration target 106 is less than the wavelength of the visible light emitted from the light source 806 (i.e., visible light ranges from about 380 nm to about 750 nm) and is less than the diffraction limit (i.e., ~200 nm). The light that passes through each hole in the calibration target 106 is output as a narrow beam of light that spreads out as the beam enters the objective 804. Each beam of light output from a hole in the calibration target 106 is collected by the objective 804 and experiences distortions due to chromatic aberration and the diffraction limit of the objective 804. As a result, each beam of light output from a hole in the calibration target 106 is split into divergent, differently colored beams comprising the spectrum of the beam output from the hole. The chromatic aberrations are a type of optical distortion where a lens is not able to focus all of the wavelengths of light passing through the lens to the same convergence point. Chromatic aberrations result from a lens having a different refractive index for different wavelengths of light. A typical objective includes films or lens coatings that provide some correction to the chromatic aberrations. FIG. 8B shows an example of a beam of white light output from a hole in a sub-region 811 of the calibration target 106. The sub-region 811 is identified in FIG. 1B by dashed-line enclosure 120 and represents an example portion of the calibration target 106 that falls within the field of view of the objective 804. In the example of FIG. 8B, the objective 804 (shown in FIG. 8A) is represented by a block and directional arrow 812 represents the direction of a beam of light output from a hole 814 in the sub-region 811. As the beam of light 812 passes through the objective 804, the lenses comprising the objective 804 create chromatic aberrations that split the beam 812 into different colored beams with each beam diverging from the original path of the beam 812 and each beam is a different color component in the color spectrum of the light comprising the beam 812. For example, differently patterned directional arrows 816-818 represent just the blue, green and red color component beams of the beam 812. The different colored beams 816-818 diverge from the path of the beam 812 due to the chromatic aberration and diffraction limit of the objective 804.

Returning to FIG. 8A, the microscope includes three dichroic mirrors 820-822 that are configured to reflect blue, green and red wavelength ranges in the visible spectrum to corresponding detectors 824-826 that are connect to a computer system 827, such as the computer system described below with reference to FIG. 17, for image processing. Directional arrows 828-830 represent the blue, green and red color components of an image of the sub-region 811 for a particular magnification. Dichroic mirror 820 passes light in the red and green wavelength ranges and reflects light in the blue wavelength range to the image plane of the detector 824; dichroic mirror 821 passes light in the red wavelength range and reflects light in green wavelength range to the image plane of the detector 825; and dichroic mirror 822 reflects light in the red wavelength range to the image plane of the detector 826. As a result, the detector 824 captures the blue component of the image of the sub-region 811, the detector 825 captures the green component of the image of the sub-region 811, and the detector 826 captures the red component of the image of the sub-region 811. These three separate images are blue, green and red images of the blue, green and red color components of the light output from the holes, are captured for the same magnification and are sent to the computer system 827 for image processing. The three separate blue, green and red images can be captured simultaneously or at different times for the same magnification. For example, if the images are to be captured at different times for the same magnification, then only one of the dichroic mirrors and corresponding detectors is used at a time to capture the corresponding color image.

Figure 8C:
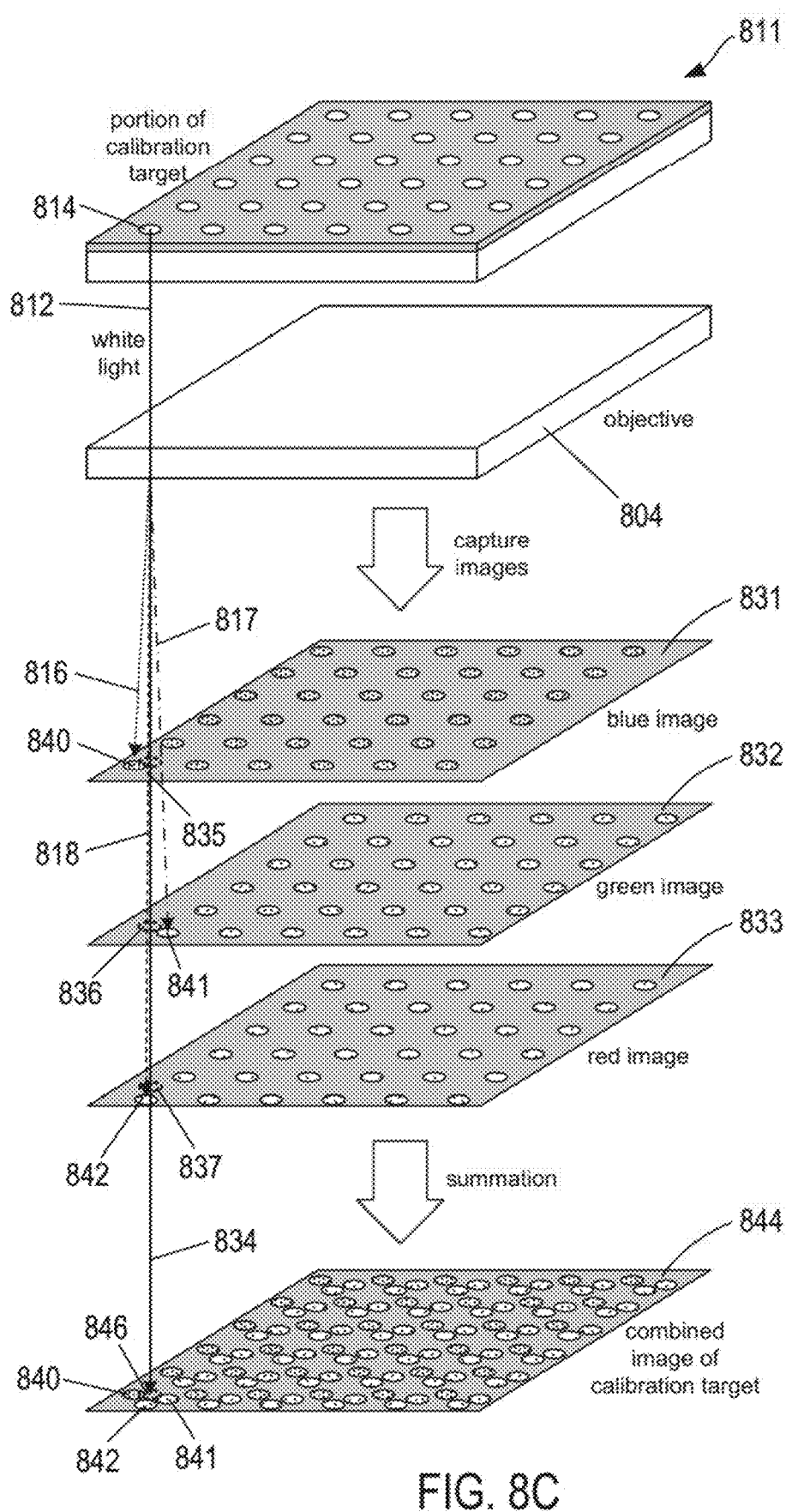
FIG. 8C shows an example of three separate color component images associated with light output from holes in a sub-region of a calibration target.

Because the objective 804 causes the beams of light output from the holes in the calibration target 106 to separate into divergent color components, as described above with reference to FIG. 8B, the holes represented in the separate blue, green and red images are not aligned. FIG. 8C shows an example representation of three separate blue, green and red images of the sub-region 811 shown in FIG. 8B. As described above with reference to FIG. 8B, the objective 804 causes the light beam output from each hole to split into separate divergent beams of colored light. In the example representation of FIG. 8C, blue, green and red images 831-833 represent the images captured by the detectors 824-826 as described above with reference to FIG. 8A for a particular magnification of the calibration target 106. The spots in the separate images 831-833 are not aligned because the corresponding colored beams diverge. For example, as shown in FIG. 8C, directional arrow 834 represents the path of the light beam 812 output from the hole 814 and dashed circles 835-837 represent where the image of the light beam 812 would be located in each of the images 831-832. However, due to the chromatic aberration and diffraction limit of the objective 804, the spots in the three separate blue, green and red component images are produced. The blue component of the light output from the hole 814 is represented by a blue spot 840 in the blue image 831, the green component of the light output from the hole 814 is represented by a green spot 841, and the red component of light output from the hole 814 is represented by a red spot 842 in the red image 833. The three images 831-833 are summed by the processor 828 to produce a combined pre-image 844. The pre-image 844 is a single image of just the blue, green and red components of each beam of light output from the holes of sub-region 811 for a particular magnification. For example, dashed circle 846 represents the spot where the light output from the hole 814 would appear in the image 844, but due to the chromatic aberration and diffraction limit of the objective 804, the light output from the hole 814 is split into component colors with just three of the component colors representing in the image 844 as the blue, green and red spots 840-842. Although the blue, green and red spots are not aligned in the separate images 831-833, each spot is a focused and undistorted image of a color component of the light output from a corresponding hole for a particular magnification. For example, the blue, green and red spots 840-842 in the images 831-833 are each focused and undistorted separate images of just the blue, green and red color components of the beam 812.

Figure 8D:
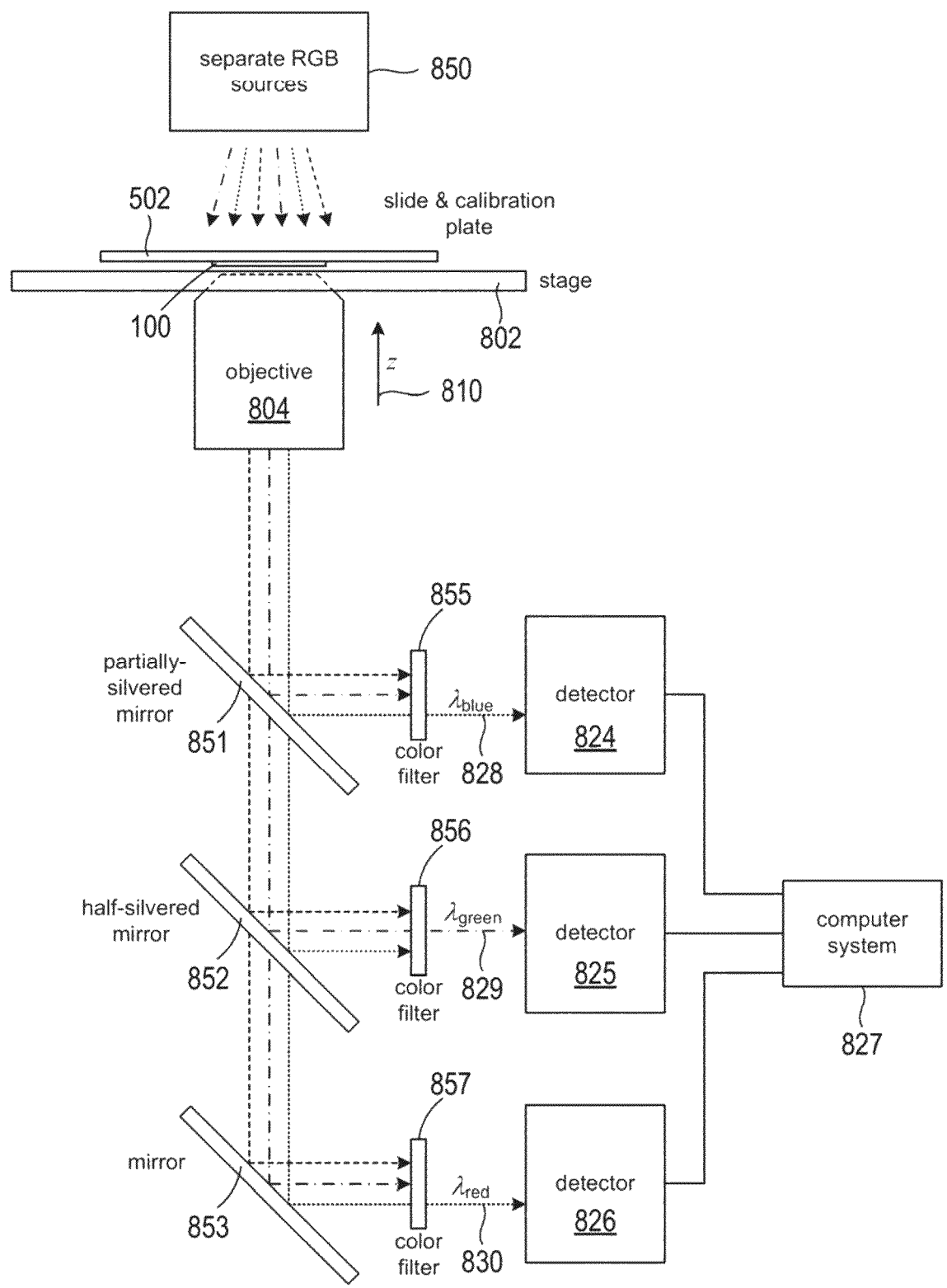
FIG. 8D shows an example of a microscope with separate light sources that each emit light in different wavelength ranges of the visible spectrum.

As described above, the calibration device can be used with microscopes that use light sources composed of a combination of LEDs and/or lasers with each LED or laser emitting light in a different narrow wavelength range of the visible spectrum. FIG. 8D shows an example of a microscope with a light source 850 composed of separate blue, green and red light sources. The microscope shown in FIG. 8D is similar to the microscope described above with reference to FIG. 8A except the three dichroic mirrors 820-822 are replaced by a partially-silvered mirror 851, a half-silvered mirror 852, a mirror 853 and corresponding blue, green and red color filters 855-857. The source 850 outputs light in narrow blue, green and red wavelength bands of the visible spectrum that pass through each hole in the calibration target of the calibration plate 100 and are collected and focused by the objective 804, as described with reference to FIGS. 8A and 8B. The partially-silvered mirror 851 reflects approximately ⅓ of light output from the objective 804 toward the filter 855, which passes only the light in the narrow blue wavelength band, while approximately ⅔ of the light passes through the mirror 851 to the half-silvered mirror 852. The mirror 852 reflects approximately half of the light transmitted through the mirror 851 toward the filter 856, which passes only the narrow green band. The light transmitted through the mirror 852 is reflected by the mirror 853 toward the filter 857, which only passes light in the narrow red band. The detectors 824-826 capture blue, green and red images of the sub-region 811, as described above with reference to FIGS. 8A and 8C.

In the example of FIGS. 8A-8D, blue, green and red components of the light output from the objective 804 are used because the blue, green and red components are primary colors that can be combined with different irradiances to generate a variety of different colored images. Alternatively, other types of light sources, dichroic mirrors and filters that generate, reflect, and transmit colors other than blue, green and red can be used to capture different color component images of the light output from the objective.

Figure 9A:
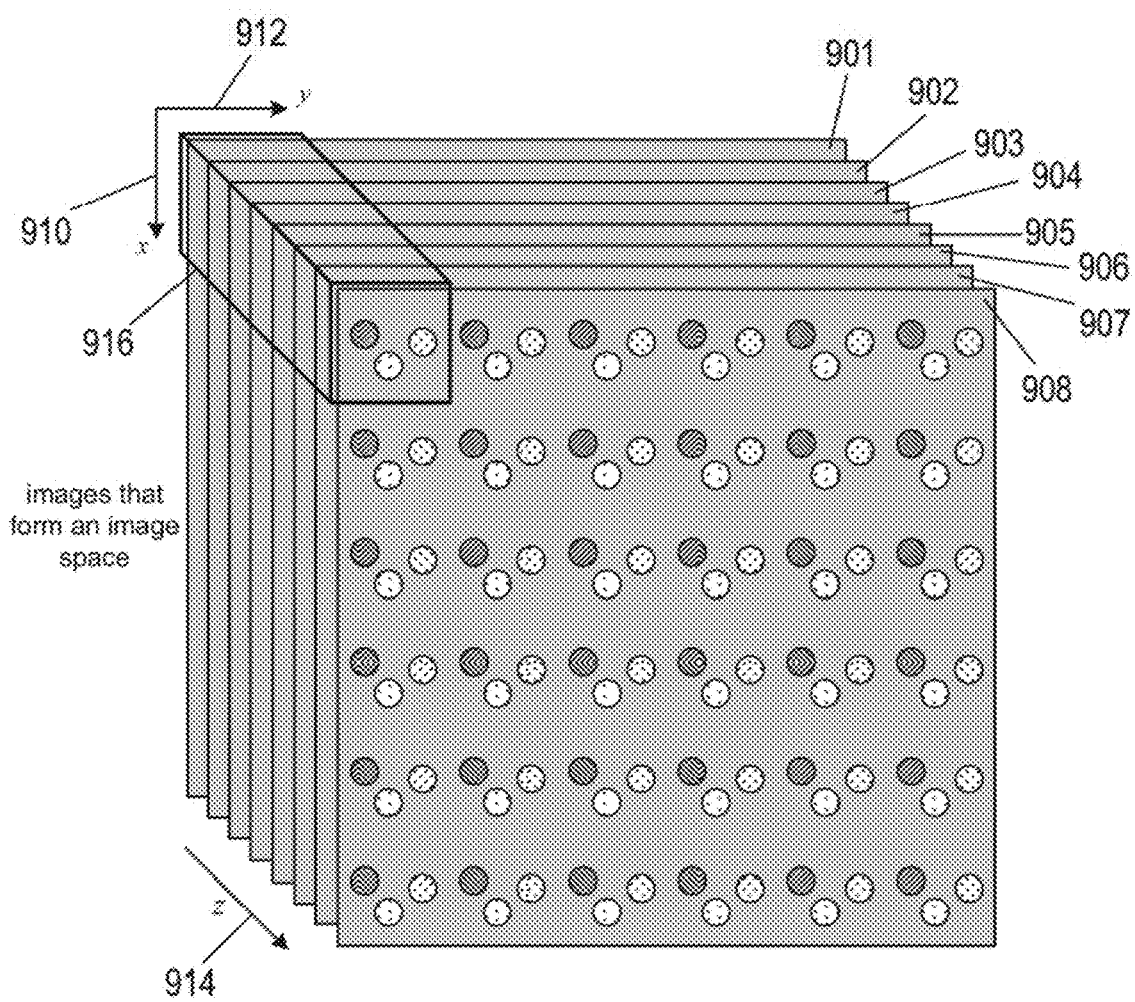
FIGS. 9A-9B show example representations of a series of pre-images associated with a sub-region of a calibration target.
Figure 9B:
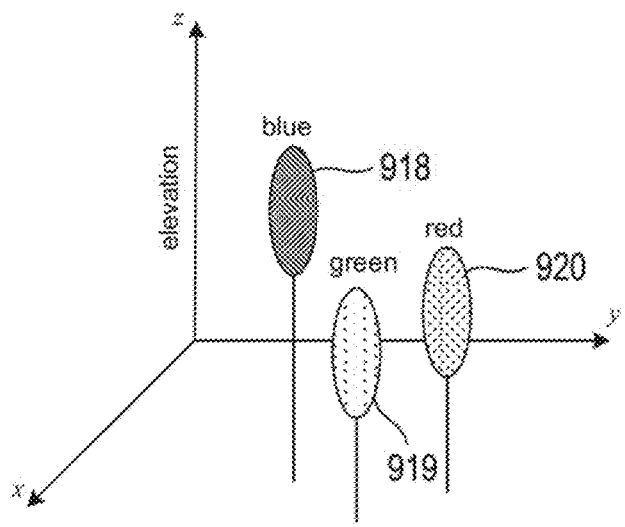

Microscopes are often used to image a series of object planes between a sample and the microscope objective. This operation can be used to produce a set of image planes that together represent a three-dimensional image space of the images formed by the objective. FIG. 9A shows an example representation of a series of pre-images 901-908 associated with the sub-region 811 of the calibration target 106. Each of the pre-images 901-908 is obtained using a different focus of the sub-region 811, and the pre-images 901-908 form a three-dimensional image space of the component light beams output from each of the holes in the sub-region 811. Directional arrows 910 and 911, denoted as x- and y-axes, represent the plane of the sub-region 811, and directional arrow 914 represents the elevation of the pre-images 901-908 above the sub-region 811 with each pre-image associated with a different object plane of the sub-region 811. The image space reveals where the objective 804 focuses the blue, green and red light components of the light output from each hole in the sub-region 811. FIG. 9B shows a hypothetical perspective view of a region 916, shown in FIG. 9A, in the image space created using the objective 804. Spots 918-920 represent separate blue, green and red focal points of the separate blue, green and red components of a single beam of light output from a hole in the sub-region 811. The spots 918-920 represent how the objective 804 focuses the blue, green and red components into separate focal points that are centered at different points in the three-dimensional image space associated with the objective 804.

The pre-images of the calibration target 106 can then be processed using various imaging techniques to obtain calibrated images and associated image-calibration parameters that can, in turn, be used to process images of samples with magnification resolution below the diffraction limit. An example of a suitable microscope imaging technique that can be used to obtain the calibration parameters is dense stochastic-sampling imaging ("DSSI") described in U.S. patent application Ser. No. 12/751,816 filed Mar. 31, 2010 and owned by Applied Precision, Inc., a GE Healthcare company, which is herein incorporated by reference. Because the details of DSSI are described in patent application Ser. No. 12/751,816, an overview of image-calibration parameters obtained using DSSI as applied to the pre-images of the calibration target 100 is now provided.

Figure 10:
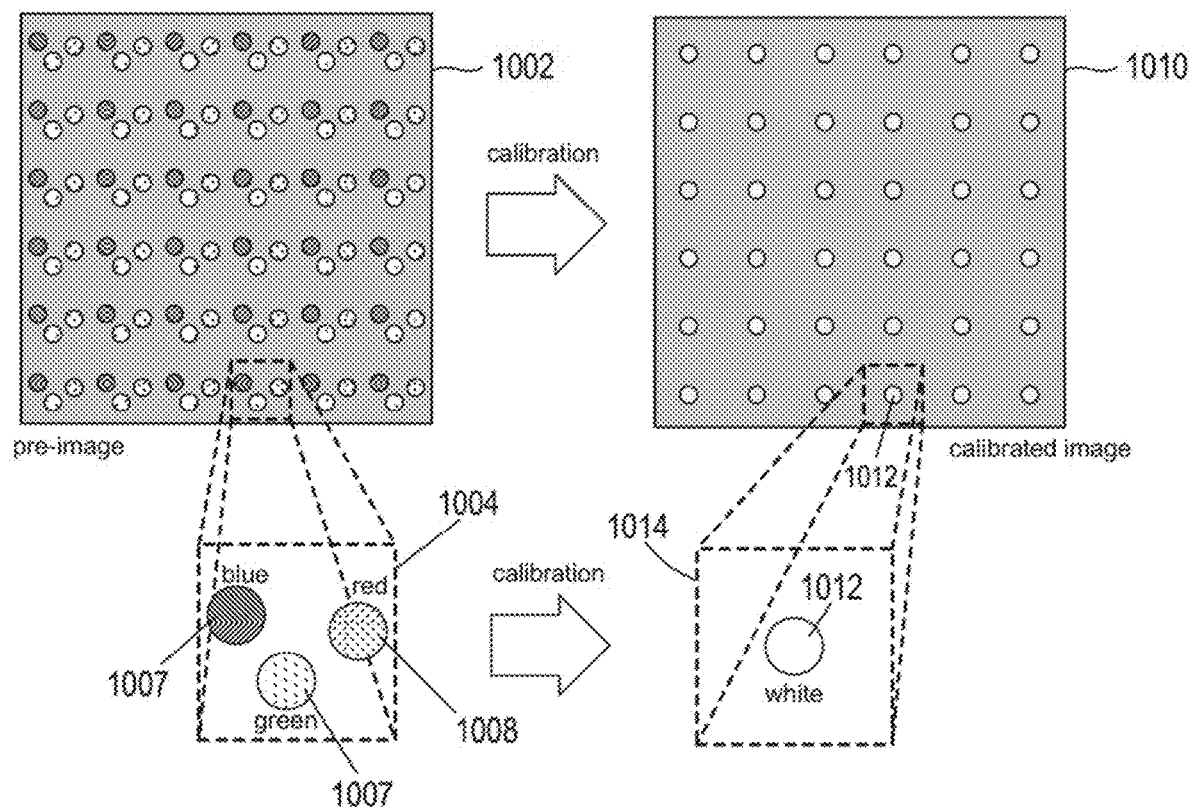
FIG. 10 shows a hypothetical example of image calibration used to correct for chromatic aberration and diffraction limit of an objective.

FIG. 10 shows a hypothetical example of how image calibration can be used to correct for chromatic aberration and diffraction limit of an objective. In FIG. 10, image 1002 represents a pre-image for a particular magnification of the sub-region 811 that has been obtained as described above with reference to FIG. 8. Each triplet of differently shaded spots represents the blue, green and red spots of the objective 804 for a particular magnification. For example, FIG. 10 includes an enlarged view 1004 of blue, green and red spots 1006-1008. The blue, green and red spots 1006-1008 represent an image of the blue, green and red component colors of a single beam of light output from a hole in the sub-region 811. Although the chromatic aberration and diffraction limit of the objective 804 cause each beam of light output from a hole in the calibration target to separate into color component beams, each spot associated with a color component is a magnified, focused and undistorted image of that color component of the light output from the hole. For example, the blue, green and red spots 1006-1008 are each magnified, focused and undistorted images of the blue, green and red components of the light output from a corresponding hole in the sub-region 811 for a particular magnification. These three separate components are placed in different spatial locations in the image plane represented by the image 1002 due to the chromatic aberration and diffraction limit of the objective 804. Image calibration adjusts spatial parameters of the image 1002 in order to combine the color component spots associated with the light output from each hole to produce a calibrated image 1010 of the sub-region 811. The calibrated image 1010 represents a magnified image of the sub-region 811 with each spot, such as spot 1012, representing a magnified, focused and undistorted image of the light output from each hole in the sub-region 811. Each spot in the image 1010 can be generated using DSSI to combine the corresponding color component spots in the pre-image 1002. For example, FIG. 10 includes an enlargement 1014 of the spot 1012 which appears as an undistorted white spot in the calibrated image 1010 and is produced by combining the blue, green and red spots 1006-1008. In other words, each set of color component spots in the pre-image 1002 are combined to produce a single spot in the calibrated image 1010 with each spot in the calibrated image 1010 appearing in focus (i.e., with no distortion due to chromatic aberration and the diffraction limit of the objective 804) even though the spots in the calibrated image 1010 are magnified views of the light output from holes with diameters below the diffraction limit of the objective 804.

FIGS. 11A-11D show a graphical representation of calibration parameters that are adjusted in order to produce the calibrated image 1010 from a pre-image 1002. Calibration includes a combination of image translation, image rotation, magnification, and non-linear geometric distortions, which are in turn used to combine the color component spots associated with each hole in the sub-region 811. FIG. 11A shows an example representation of how calibration combines blue, green and red spots 1101-1103 associated with the three separate blue, green and red images to form a single focused, undistored spot 1104 that represents an image of light transmitted through a hole in the calibration device 100. As shown in FIG. 11A, the spots 1101-1103 have intensity profiles represented by Gaussian distributions 1105-1107, respectively. Calibration is process that uses translation, rotation, magnification, and geometric distortions to adjust the coordinates and size of the intensity peaks so that the intensity peaks are aligned to produce the spot 1104 with an associated intensity profile 1108. FIGS. 11B-11C show examples of image translation and rotation with respect to a three-dimensional Cartesian coordinate reference frame characterized by X, Y, and Z coordinates. FIG. 11B represents an example of translating each of the separate pre-image blue, green and red color component images 1110-1112 within the reference frame to align color component spots associated with the same hole in the calibration target. Directional arrows, such as directional arrows 1114-1116, represent the three different directions each of the color components images can be translated in the reference frame. FIG. 11C represents an example of rotating each of the separate pre-image blue, green and red color component images 1110-1112 with respect to the reference frame coordinates to further align color component spots associated with the same hole. Directional arrows 1118-1120 represent the orthogonal x, y, and z local coordinates associated with the image plane 1110 that have been rotated relative to the reference frame to further align the color components spots associated with the same hole. Non-linear geometric distortions is a digital image processing technique in which portions of color component images are digitally manipulated to further align the color component spots associated with the same hole. In the example of FIG. 11D, non-linear distortions of three overlapping sub-regions 1122-1124 of the images 1110-1112, respectively, are distorted to align the spots associated with the same hole and can be focal depth dependant. For example, translation, rotation, adjustments in magnification and distortion of the sub-regions 1122-1124 aligns the spots 1125-1127 associated with the same hole.

Figure 12:
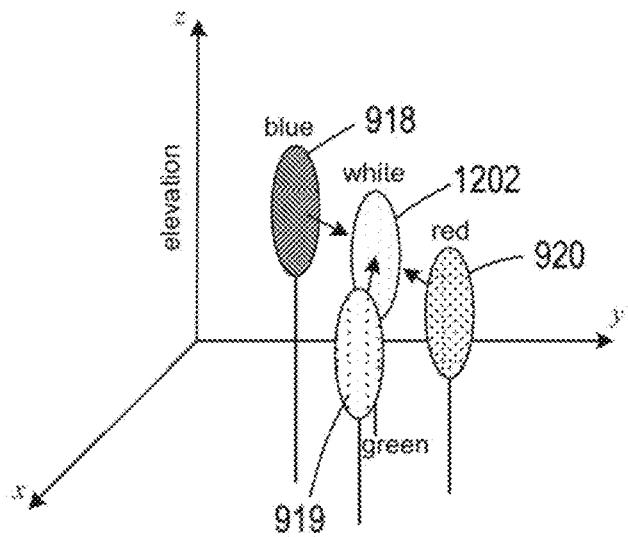
FIG. 12 shows a hypothetical perspective view of a region in a three-dimensional image space associated with subregion of a calibration target.

The pre-images that form a three-dimensional image space can be translated, rotated and locally warped to shift the focal point of the color components to a common focal point. FIG. 12 shows a hypothetical perspective view of the region 916, shown in FIG. 9B. Calibration can be used to shift the blue, green and red focal points 918-920 to a single focal point 1202 that corresponds to the focal point of the beam of light output from a hole in the sub-region 811 in the absence of distortions due to chromatic aberrations and the diffraction limit of the objective 804.

Figure 13:
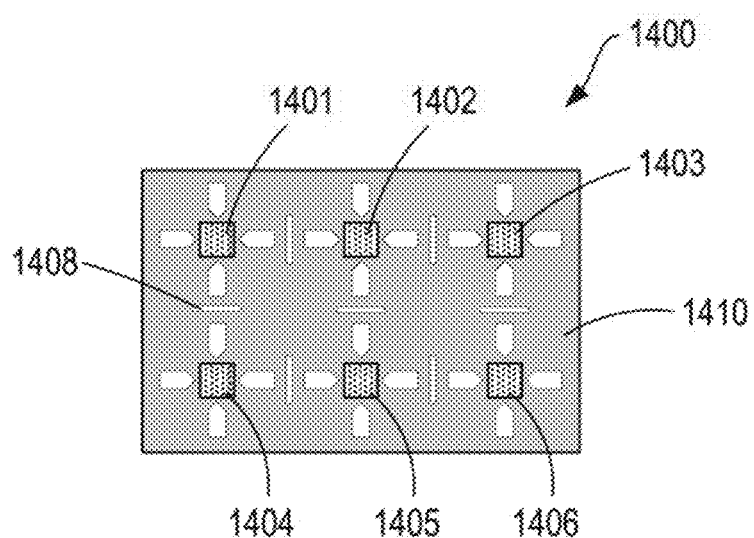
FIG. 13 shows an optical microscope calibration device with six separate calibration targets.

In alternative embodiments, rather than limiting the calibration device to just one calibration, the calibration device can include any number of calibration targets with features varied or the same for each calibration target. FIG. 13 shows an optical microscope calibration device 1300 with six separate calibration targets 1301-1306. Each adjacent pair of calibration target is separated by a spacer, such as spacers 1308, painted on or etched into an opaque layer 1310 of the device 1300. The calibration targets 1301-1306 can have the feature sizes or the calibration targets 1301-1306 can have any combination of feature sizes. For example, calibration targets 1301-1303 can be composed of holes in the opaque layer 1310 with a diameter of about 90 nm, while calibration targets 1304-1306 can be composed of holes with a diameter of about 110 nm.

One or more calibration devices can also be formed in a cover slip to enable determination of the calibration parameters followed by imaging a sample below the diffraction limit by simply sliding the sample into the field of view of the microscope objective and using the calibration parameters to process the images of the sample. FIGS. 14A-14B show an isometric and top-plan view of a cover slip 1400 with a calibration device 1402 formed in a portion of the cover slip. The calibration device 1402 includes a calibration target 1406 and directional arrows 1408 that are configured in the same manner as the calibration device 100 described above, but unlike the calibration device 100, which includes a transparent plate 104, the calibration device 1402 includes a relatively larger transparent plate 1404. A first region of the plate 1404 is dedicated to the calibration device 1402 and a second region 1410 of the plate 1404 is uncovered to receive a sample. The calibration device 1402 is used in the same manner as the calibration device 100, but the remaining uncovered region 1410 of the cover slip 1400 can be placed over a sample to be viewed using the microscope.

Figure 15A:
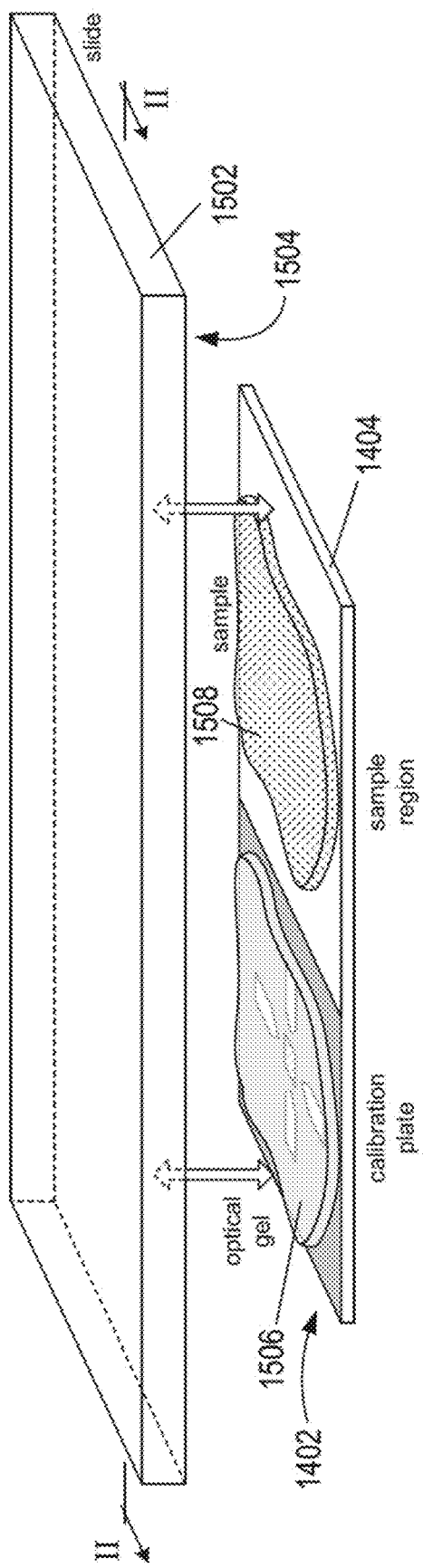
FIGS. 15A-15B show a cover slip with a calibration secured to a microscope slide.
Figure 15B:
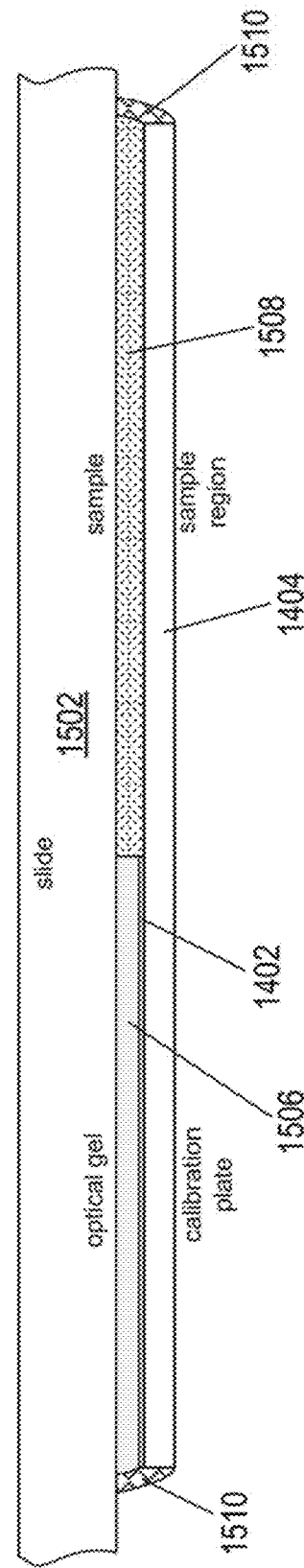

FIG. 15A shows the calibration device 1402 and cover slip 1404 to be secured to a surface of a microscope slide 1502. In FIG. 15A, the calibration device 1402 is positioned so that the opaque surface of the calibration device 1402 faces a surface 1504 of the slide 1502. An optical gel 1506 having an index of refraction that substantially matches the refractive indices of the slide 1502 and the cover slip 1404 is disposed between the opaque surface and the surface 1504, and a sample 1508 is place on the uncovered region 1410 of the cover slip 1404. FIG. 15B shows a cross-sectional view of the cover slip attached to the surface 1504 of the slide 1502 along a line II-II, shown in FIG. 15A. An adhesive 1510 located along the edges of the cover slip 1400 can be used to secure the cover slip 1400 to the slide 1502. The adhesive 1510 can be a polymer adhesive, such as tosylamide-formaldehyde resin, which can adhere to a polished surface, such as the polished surface 1504.

Figure 16:
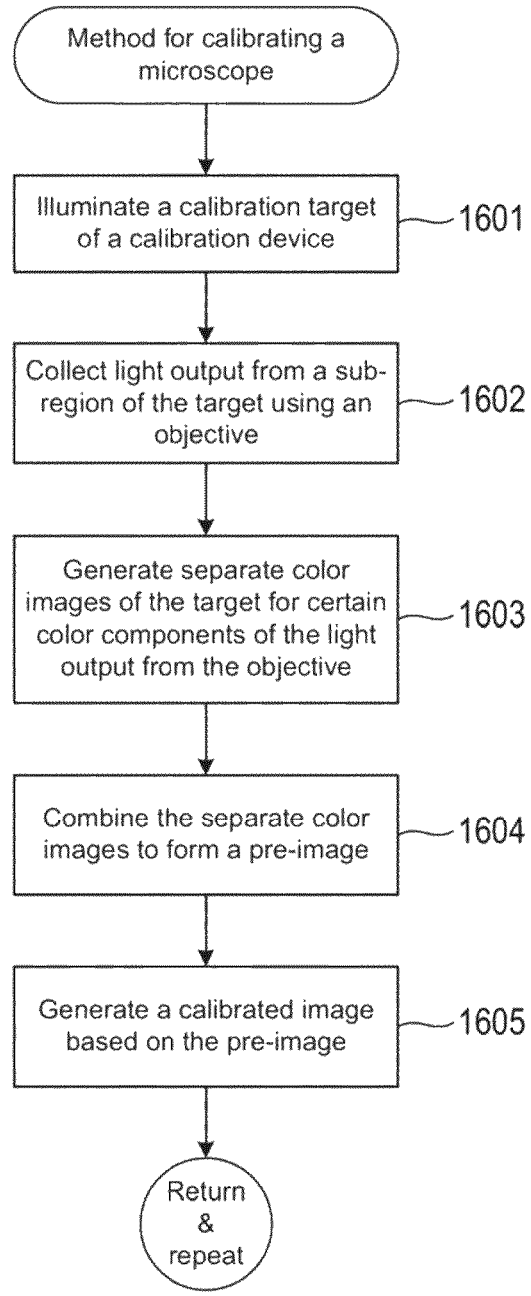
FIG. 16 shows a flow diagram of a method to obtain images of sample below the diffraction limit.

FIG. 16 shows a flow diagram of a method to obtain images of sample below the diffraction limit. In block 1601, a calibration target is illuminated using a light source as described above with reference to FIGS. 8A and 8D. In block 1602, light output from a sub-region of the calibration target is collected using a microscope objective as described above with reference to FIGS. 8A and 8D. In block 1603, separate color images of the target for certain color components of the light output from the objective are generated, as described above with reference to FIGS. 8A and 8C. In block 1604, the separate color images are combined to form a pre-image, as described above with reference to FIG. 8C. In block 1605, a calibrated image based on the pre-image using video processing, such as DSSI, is generated. The magnification and image calibration parameters used to adjust the pre-image of the calibration target, such as pre-image 1002, to produce the calibrated image of the calibration target, such as calibrated image 1010, are stored. The image magnification and associated calibration parameters of the calibration target are saved so that when an actual sample is imaged using a particular magnification, the associated calibration parameters can be used to adjust a diffraction limited image of the sample.

Figure 17:
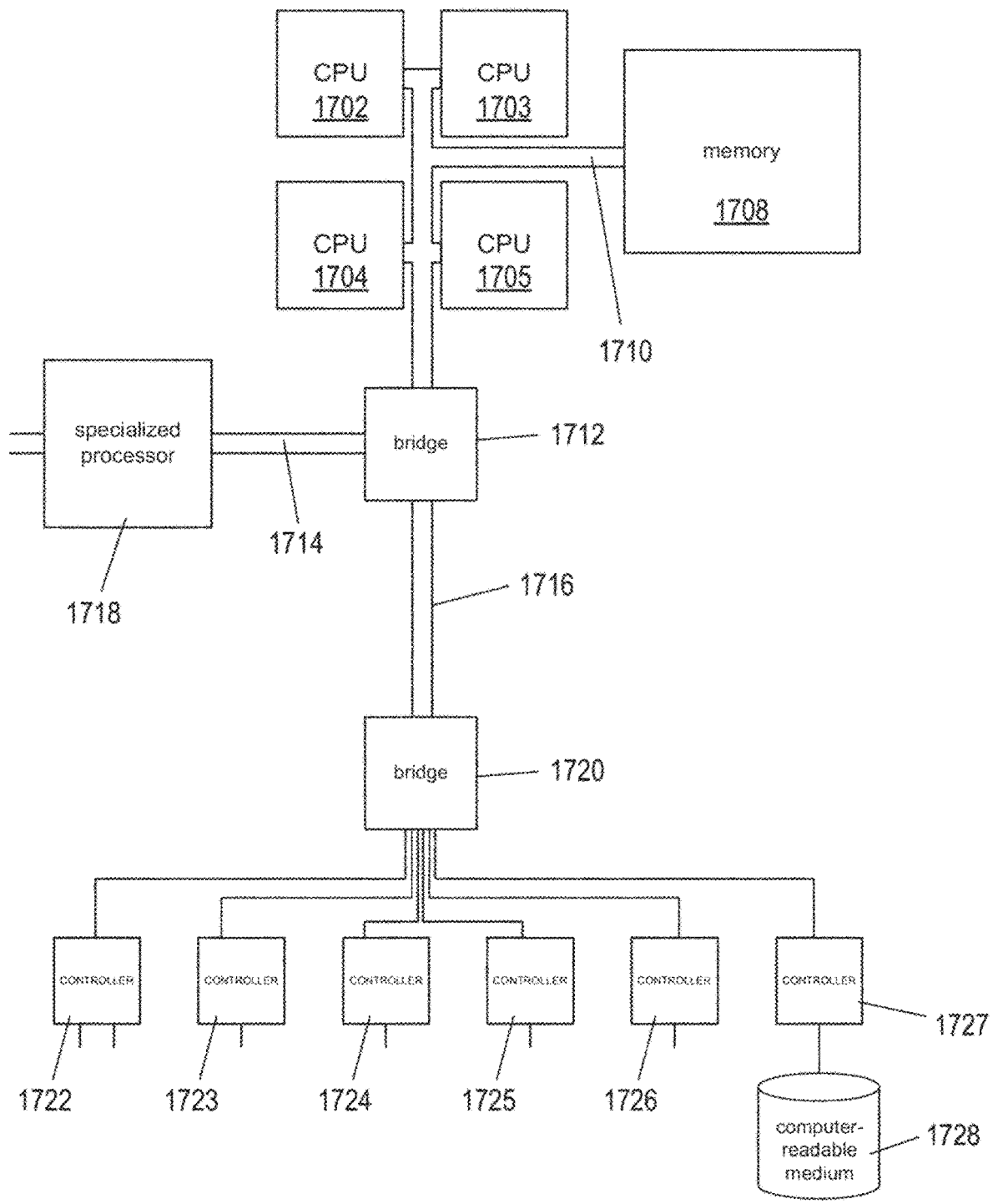
FIG. 17 shows a typical electronic computer system that executes image-processing steps.

FIG. 17 shows a typical electronic computer system that executes the image-processing steps of DSSI or another suitable image processing method. The computer system contains one or multiple central processing units ("CPUs")

1702-1705, one or more electronic memories 1708 interconnected with the CPUs by a CPU/memory-subsystem bus 1710 or multiple busses, a first bridge 1712 that interconnects the CPU/memory-subsystem bus 1710 with additional busses 1714 and 1716, or other types of high-speed interconnection media, including multiple, high-speed serial interconnects. These busses or serial interconnections, in turn, connect the CPUs and memory with specialized processors, such as a graphics processor 1718, and with one or more additional bridges 1720, which are interconnected with high-speed serial links or with multiple controllers 1722-1727, such as controller 1727, that provide access to various different types of computer-readable media, such as computer-readable medium 1728, electronic displays, input devices, and other such components, subcomponents, and computational resources. The computer readable medium 1728 can be any suitable medium that participates in providing instructions to the CPUs for execution. For example, the computer readable medium 1728 can be non-volatile media, such as firmware, an optical disk, flash memory, a magnetic disk, or a magnetic disk drive. Image processing may also be implemented on distributed computer systems and can also be implemented partially in hardware logic circuitry.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents.

What is claimed is:

1. A cover slip for calibrating an optical system, the cover slip comprising:
    a transparent plate having a first surface and a second surface opposite to the first surface;
    an opaque layer disposed on the first surface; and
    a calibration target formed in the opaque layer, wherein the calibration target comprises a plurality of features each having a dimension less than the diffraction limit of the optical system used to image the calibration target,
    wherein each of the plurality of features spans through the height of the opaque layer and exposes a portion of the first surface of the transparent plate, such that a light incident on the opaque layer entering each of the plurality of features passes through the exposed portion of the first surface across a thickness of the transparent plate and outputs from the second surface of the transparent plate,
    wherein the plurality of the features are arranged in a two-dimensional lattice arrangement, and
    wherein the two-dimensional lattice arrangement comprises an inner lattice of features and a less densely-packed radially outer lattice of features.

2. The cover slip of claim 1, further comprising a first adhesive layer disposed between the first surface of the transparent plate and the opaque layer.

3. The cover slip of claim 1, wherein the first adhesive layer comprises a metal or a polymer adhesive.

4. The cover slip of claim 3, wherein the polymer adhesive comprises a tosylamide-formaldehyde resin.

5. The cover slip of claim 1, wherein the dimension ranges from about 50 nm to about 190 nm.

6. The cover slip of claim 1, wherein the plurality of features comprise holes having substantially straight cylindrical sidewalls.

7. The cover slip of claim 1, wherein the calibration target further comprises a directional feature arranged to aid in positioning of at least a portion of the calibration target to be within a field of view of an objective of the optical system.

8. The cover slip of claim 7, wherein the directional feature is a directional arrow, a fluorescent bead, a reflective bead, or a combination thereof.

9. The cover slip of claim 1, wherein the first surface of the transparent plate further comprises a sample region adjacent to a region the opaque layer is disposed thereon, for accepting a sample to be disposed on said sample region.

10. The cover slip of claim 1, further comprising an optical gel disposed on top of the opaque layer to establish an operational contact with a slide of the optical system.

11. The cover slip of claim 10, wherein the optical gel has an index of refraction that substantially matches refractive indices of the slide and the transparent plate.

12. The cover slip of claim 1, wherein the optical system is a microscope comprising an objective and a detector, and each of the plurality of the features is configured to have a dimension less than the diffraction limit of the microscope, so that an output light from the opposite second surface of the transparent plate is split by the objective into a plurality of color component beams, and separate color images for the color component beams are generated by the detector, with each color image representing a focused and undistorted image of a corresponding color component beam of the output light.

13. The cover slip of claim 12, wherein the separate color images are processed to form a pre-image of the calibration target and to generate, based on the pre-image, a calibrated image showing a focused and undistorted image of the calibration target.

14. A slide assembly comprising:
    the cover slip of claim 1;
    a slide having a surface in operational contact with the cover slip; and
    a second adhesive disposed along edges of the cover slip and configured to attach the cover slip to be in operational contact with a surface of the slide.

15. A method for manufacturing a cover slip for calibrating an optical system, the method comprising:
    providing a transparent plate having a first surface and a second surface opposite the first surface;
    depositing an opaque layer on the first adhesive layer;
    forming, within the opaque layer, a calibration target comprising a plurality of features spanning through a thickness of the opaque layer and exposing a portion of the first surface of the transparent plate, each of the features having a dimension less than the diffraction limit of the optical system used to image the calibration target, such that a light originating from the optical system incident on the opaque layer and entering each of the plurality of features from the first surface of the transparent plate passes through the exposed portion of the first surface across a thickness of the transparent plate and outputs from the opposite second surface of the transparent plate, wherein forming the calibration target further comprises forming a two-dimensional lattice arrangement comprising an inner lattice of features and a less densely-packed radially outer lattice of features.

16. The method of claim 15, further comprising depositing an optical gel on top of the opaque layer for establishing an operational contact with a slide of the optical system, and selecting an index of refraction of the optical gel that substantially matches refractive indices of the slide and the transparent plate.

17. The method of claim 15, wherein forming the plurality of features comprises forming a plurality of holes having substantially straight cylindrical sidewalls.

18. The method of claim 15, further comprising disposing and arranging a directional feature on the opaque layer to aid in positioning of at least a portion of the calibration target to be within a field of view of an objective of the optical system.

19. The method of claim 15, further comprising depositing a second adhesive along edges of the cover slip, wherein the second adhesive is configured to attach the cover slip to be in operational contact with a slide used in the optical system.

* * * * *